(12) United States Patent
Yamamoto et al.

(10) Patent No.: US 11,105,374 B2
(45) Date of Patent: Aug. 31, 2021

(54) ROLLING BEARING UNIT

(71) Applicant: NTN CORPORATION, Osaka (JP)

(72) Inventors: Naota Yamamoto, Mie (JP); Shota Toho, Mie (JP); Hiroshi Uchimura, Mie (JP)

(73) Assignee: NTN CORPORATION, Osaka (JP)

( * ) Notice: Subject to any disclaimer, the term of this patent is extended or adjusted under 35 U.S.C. 154(b) by 398 days.

(21) Appl. No.: 16/092,984

(22) PCT Filed: Apr. 5, 2017

(86) PCT No.: PCT/JP2017/014256
§ 371 (c)(1),
(2) Date: Oct. 11, 2018

(87) PCT Pub. No.: WO2017/179470
PCT Pub. Date: Oct. 19, 2017

(65) Prior Publication Data
US 2020/0325938 A1    Oct. 15, 2020

(30) Foreign Application Priority Data

Apr. 12, 2016  (JP) .............................. JP2016-079632
Apr. 12, 2016  (JP) .............................. JP2016-079635
Apr. 12, 2016  (JP) .............................. JP2016-079652

(51) Int. Cl.
*F16C 33/78*     (2006.01)
*F16J 15/32*     (2016.01)
(Continued)

(52) U.S. Cl.
CPC .............. *F16C 33/78* (2013.01); *F16C 19/38* (2013.01); *F16C 41/002* (2013.01);
(Continued)

(58) Field of Classification Search
CPC ........ F16C 19/38; F16C 41/00; F16C 41/002; F16C 2233/00; F16C 33/667;
(Continued)

(56) References Cited

U.S. PATENT DOCUMENTS 4,884,901 A * 12/1989 Harsdorff ............ F16C 33/7886
384/448
5,480,232 A    1/1996 Lendway
(Continued)

FOREIGN PATENT DOCUMENTS

JP            54-63843        5/1979
JP            04-357326       12/1992
(Continued)

OTHER PUBLICATIONS

Machine Translation of JP-2013145028-A (Year: 2013).*
(Continued)

*Primary Examiner* — Alan B Waits
(74) *Attorney, Agent, or Firm* — Wenderoth, Lind & Ponack, L.L.P.

(57) ABSTRACT

A rolling bearing unit includes an outer race and an inner race between which a bearing space is defined; and a circular annular seal member covering a side opening of the bearing space. The circular annular seal member is constituted by a plurality of circumferentially divided seal member parts circumferentially adjacent to each other, and coupled together as a circular annular coupled member by coupling pieces. The seal member includes a distance adjuster capable of adjusting the circumferential distance between a pair of connection portions where the seal member parts are connected to one of the coupling pieces.

18 Claims, 24 Drawing Sheets

(51) Int. Cl.
*F16C 19/38* (2006.01)
*F16C 41/00* (2006.01)
*F16J 15/3272* (2016.01)

(52) U.S. Cl.
CPC ....... *F16J 15/3272* (2013.01); *F16C 33/7813* (2013.01); *F16C 33/7886* (2013.01)

(58) Field of Classification Search
CPC .............. F16C 33/7813; F16C 33/7843; F16C 33/7869; F16C 33/7873; F16C 33/7886; F16C 33/80; F16C 33/805; F16J 15/3272; F16J 15/3488
See application file for complete search history.

(56) References Cited

U.S. PATENT DOCUMENTS

| | | | | |
|---|---|---|---|---|
| 6,546,785 | B1* | 4/2003 | Discenzo | F16C 19/52 73/53.05 |
| 9,506,554 | B2* | 11/2016 | Sone | F16C 19/543 |
| 2012/0187747 | A1* | 7/2012 | Dagh | B60K 7/0015 301/6.5 |
| 2014/0011622 | A1* | 1/2014 | Sone | F16C 33/7813 475/159 |
| 2015/0337902 | A1* | 11/2015 | Shimizu | F16C 33/7816 384/474 |
| 2016/0108962 | A1* | 4/2016 | Miyazaki | F16C 33/7879 384/473 |
| 2016/0327161 | A1* | 11/2016 | Sato | F16J 15/3488 |
| 2017/0210166 | A1* | 7/2017 | Abreu | B60B 35/12 |

FOREIGN PATENT DOCUMENTS

| | | | | |
|---|---|---|---|---|
| JP | 07-280180 | | 10/1995 | |
| JP | 08-093777 | | 4/1996 | |
| JP | 2003-97574 | | 4/2003 | |
| JP | 2004-293776 | | 10/2004 | |
| JP | 2008-241556 | | 10/2008 | |
| JP | 2010-060042 | | 3/2010 | |
| JP | 2012-102767 | | 5/2012 | |
| JP | 2013145028 A | * | 7/2013 | .......... F16C 33/7823 |
| JP | 2014-231856 | | 12/2014 | |

OTHER PUBLICATIONS

International Preliminary Report on Patentability dated Oct. 16, 2018 in International (PCT) Application No. PCT/JP2017/014256, with English Translation.

\* cited by examiner

ROLLING BEARING UNIT

TECHNICAL FIELD

The present invention relates to rolling bearings lubricated by oil, particularly to a rolling bearing unit capable of catching foreign objects contained in lubricating oil.

BACKGROUND ART

Rolling bearings are mounted to moving parts of transportation machines, industrial machines, or various other machines. Some of such machines include an operation mechanism which needs to be lubricated by oil, such as the portions of gears meshing with each other, or the portions of components in sliding contact with each other, and are configured such that the operation mechanism and the rolling bearings are lubricated by common oil.

For example, devices such as oil pumps include, in their interiors, a rolling bearing and an operation mechanism, and are capable of sending lubricating oil contained in the devices toward an outside operation mechanism located outside of the devices.

Foreign objects/matter such as wear dust (iron dust, etc.) may occur in the bearing space of the rolling bearing of such a device. If foreign objects/matter enters the operation mechanisms located midway of the circulation path through which lubricating oil circulates, such entry may reduce the durability of the device, damage the device, and/or cause the device to malfunction or fail to operate in an accurate manner.

In order to overcome such a problem, for example, the below-identified Patent document 1 discloses an iron dust contamination detecting method for detecting the contamination of lubricating oil by iron dust such that a warning is sent when, if foreign objects such as iron dust enter lubricating oil flowing in a circulation path, the foreign objects are attracted to magnets mounted to a sensor, and accumulates on the magnets such that a metal casing and the magnets are electrically connected to each other through the accumulated foreign objects.

The below-identified Patent document 2 discloses a seal ring closing one end of the bearing space between the inner race and outer race of a rolling bearing, and including filters for catching foreign objects.

PRIOR ART DOCUMENTS

Patent Documents

Patent document 1: Japanese Unexamined Patent Application Publication No. 1107-280180
Patent document 2: Japanese Unexamined Patent Application Publication No. 2012-102767

SUMMARY OF THE INVENTION

Problems to be Solved by the Invention

As described above, it is not preferable that foreign objects such as wear dust (iron dust, etc.) occurring in the rolling bearing enters the operation mechanism located midway of the circulation path through which lubricating oil circulates. In particular, if a rolling bearing unit is used in an oil pump, large separated pieces occurring in the rolling bearing may damage components of the operation mechanism inside of the oil pump, and/or components of the operation mechanism located midway of the circulation path through which lubricating oil sent out by the oil pump circulates, and/or cause these components to malfunction or fail to operate in an accurate manner. Therefore, it is necessary to mount in position such a circular annular seal member with filters as disclosed in Patent document 2, thereby preventing foreign objects from flowing from the interior of the rolling bearing to the operation mechanism.

If such a seal member is fixed to the outer race of the rolling bearing, the radially inner edge of the seal member comes into sliding contact with, or is opposed through a minute radial gap to, the radially outer surface of the inner race of the rolling bearing. This minute radial gap is defined between the radially inner edge of the seal member and the radially outer surface of the inner race, and is referred to as "final gap".

The size of the final gap needs to be set to be equal to or smaller than the mesh size of the filters of the seal member such that foreign objects is prevented from flowing from the interior of the rolling bearing to the operation mechanism. Therefore, when and even after the seal member is attached to the rolling bearing, it is necessary to manage the final gap.

When the seal member is manufactured, a dimension error tends to occur within tolerance. If the seal member is made of resin, this dimension error tends to be larger.

Due to this dimension error, the radially inner edge of the seal member may come into sliding contact with the radially outer surface of the inner race. Also, the thermal expansion of the seal member may decrease the final gap, so that the radially inner edge of the seal member may come into sliding contact with the radially outer surface of the inner race. If the seal member strongly comes into sliding contact with the inner race, the seal member tends to become wear, so that the final gap may further expand. Therefore, such strong contact is not preferable.

It is a first object of the present invention to appropriately manage the dimension of the final gap (radial gap) between the radially inner edge of a seal member and the radially outer surface of an inner race.

As described above, since it is not preferable that foreign objects such as wear dust (iron dust, etc.) occurring in the rolling bearing enters the operation mechanism located midway of the circulation path through which lubricating oil circulates, it is necessary to mount filters for preventing foreign objects from flowing from the interior of the rolling bearing to the operation mechanism, and to mount a sensor for detecting foreign objects.

According to Patent document 1, if the sensor has too good sensitivity, the sensor may detect large foreign objects which need to be removed by such filters as disclosed in Patent document 2, thereby sending a warning in error. Since large foreign objects are caught by the filters, and thus do not enter the operation mechanism, the sensor does not necessarily need to detect foreign objects having a size equal to or larger than the mesh size of the filters. Rather, when the amount of foreign objects which are contained in lubricating oil, and which are small enough to be allowed to pass through the filters exceeds a predetermined amount, the sensor is required to send a warning indicating that this may adversely affect the operation mechanism.

Since such a sensor as disclosed in Patent document 1 has a complex structure, it is not preferable that this sensor is mounted to the rolling bearing. It is preferable that the sensor configured to detect foreign objects contained in lubrication oil, and mounted to the rolling bearing has a simpler structure.

It is a second object of the present invention to reliably detect, if foreign objects such as wear dust (iron dust, etc.) occurring in a rolling bearing of a rolling bearing unit enters lubricating oil, the amount of the foreign objects contained in the lubricating oil, and also to mount a sensor having a simpler structure to the rolling bearing.

Means for Solving the Problems

In order to achieve the above first object, the present invention provides a rolling bearing unit comprising: an outer race and an inner race between which a bearing space is defined; rolling elements disposed in the bearing space; and a circular annular seal member attached to the outer race or a member fixed to the outer race, and covering a side opening of the bearing space, wherein the circular annular seal member includes: two or more than two seal member parts divided in a circumferential direction, and coupled together as a circular annular coupled member by coupling pieces; and distance adjusting means each capable of adjusting a circumferential distance between a pair of connection portions where the two seal member parts or each circumferentially adjacent pair of the more than two seal member parts are connected to a corresponding one of the coupling pieces.

Each of the distance adjusting means may include: a pair of engaged portions disposed on a corresponding one of the coupling pieces; a plurality of first engaging portions disposed on one of circumferentially opposed ends of the two seal member parts or a corresponding circumferentially adjacent pair of the more than two seal member parts, the first engaging portions being arranged in the circumferential direction; and a plurality of second engaging portions disposed on the other of the circumferentially opposed ends so as to be arranged in the circumferential direction. In this case, the engaged portions and the engaging portions are arranged such that one of the pair of engaged portions is capable of engaging any one of the plurality of first engaging portions, and the other of the pair of engaged portions is capable of engaging any one of the plurality of second engaging portions.

Alternatively, each of the distance adjusting means may include: a pair of engaged portions disposed, respectively, on circumferentially opposed ends of the two seal member parts or a corresponding circumferentially adjacent pair of the more than two seal member parts; a plurality of first engaging portions disposed on a corresponding one of the coupling pieces so as to be arranged in the circumferential direction; and a plurality of second engaging portions disposed on the corresponding one of the coupling pieces so as to be arranged in the circumferential direction.

The rolling bearing unit may be configured such that either the engaging portions or the engaged portions comprise protrusions, and if the engaging portions comprise protrusions, the engaged portions comprise recesses in which the protrusions can engage, and if the engaged portions comprise protrusions, the engaging portions comprise recesses in which the protrusions can engage.

Either the protrusions or the recesses may include, respectively, anti-separation projections configured to prevent the protrusions from separating from the respective recesses.

Each of the two or more than two seal member parts may include a cylindrical portion abutting against an end surface of the outer race; and a wall portion extending radially inwardly from an axial end of the cylindrical portion. Either the cylindrical portions or the wall portions of the two seal member parts or each circumferentially adjacent pair of the more than two seal members may include, at respective opposed portions thereof, a pair of stepped portions meshing with each other.

Each of the two or more than two seal member parts may include a cylindrical portion abutting against an end surface of the outer race; and a wall portion extending radially inwardly from an axial end of the cylindrical portion. A gap may be defined between circumferentially opposed ends of the cylindrical portions of the two seal member parts or each circumferentially adjacent pair of the more than two seal member parts, the gap being closed by a corresponding one of the coupling pieces.

In order to achieve the above first object, the present invention provides a rolling bearing unit comprising: an outer race and an inner race between which a bearing space is defined; rolling elements disposed in the bearing space; a circular annular seal member attached to the outer race or a member fixed to the outer race, and covering a side opening of the bearing space, and a protrusion disposed on a radially inner edge of the circular annular seal member, and kept in sliding contact with a radially outer surface of the inner race.

The protrusion may be one of a plurality of protrusions symmetrically arranged with respect to a center axis of the rolling bearing unit.

The circular annular seal member may comprise a plurality of circumferentially divided seal member parts coupled together as a circular annular coupled member by coupling pieces. The protrusion may be one of a plurality of protrusions, and one or more of the plurality of protrusions may be disposed on a straight line or lines equally dividing a central angle of each of the circumferentially divided seal member parts.

The circular annular seal member may be made of a resin reinforced with fiber.

The circular annular seal member may comprise a seal ring including a cylindrical portion abutting against an end surface of the outer race, and a wall portion extending radially inwardly from an axial end of the cylindrical portion. The cylindrical portion may include an outer race engagement protrusion configured to engage with a radially inner surface of the outer race so as to restrict a radial movement of the seal ring.

The outer race may be fixed to a housing. The circular annular seal member may comprise a seal ring including a cylindrical portion abutting against an end surface of the outer race, and a wall portion extending radially inwardly from an axial end of the cylindrical portion. The cylindrical portion may include a housing abutment portion configured to abut against a radially inner surface of the housing so as to restrict a radial movement of the seal ring.

In order to achieve the above second object, the present invention provides a rolling bearing unit comprising: an outer race and an inner race between which a bearing space is defined, and one of which is a stationary bearing race; rolling elements disposed in the bearing space; a circular annular seal member attached to one of the stationary bearing race, and a member fixed to the stationary bearing race, the circular annular seal member covering a side opening of the bearing space; a foreign object catching portion mounted to a lower portion of the circular annular seal member; and a sensor device mounted to the foreign object catching portion, and configured to detect foreign objects contained in lubricating oil.

The circular annular seal member may comprise a plurality of circumferentially divided seal member parts coupled together as a circular annular coupled member by coupling pieces. One of the coupling pieces may be provided with the foreign object catching portion.

The sensor device may be configured to electrically detect foreign objects comprising metal, and adhering between a pair of electrodes.

The foreign object catching portion may include a foreign object discharge port vertically extending through the seal member from a side of the seal member facing the bearing space to a side of the seal member opposite from the bearing space.

The foreign object catching portion may include an upwardly facing concave pocket. Especially, the concave pocket may comprise a funnel-shaped pocket, the foreign object discharge port may be located in the funnel-shaped pocket, and the pair of electrodes may comprise a plurality of pairs of electrodes disposed along a vertical direction in the funnel-shaped pocket such that distances between the respective pairs of electrodes are different from each other.

Effects of the Invention

The rolling bearing unit of the present invention includes a circular annular seal member covering the side opening of the bearing space between the outer race and the inner race, and constituted by a plurality of circumferentially divided seal member parts circumferentially adjacent to each other, and coupled together as a circular annular coupled member by the coupling pieces. The seal member includes distance adjusting means each capable of adjusting the circumferential distance between a pair of connection portions where the seal member parts are connected to one of the coupling pieces. Therefore, it is possible to appropriately manage the dimension of the final gap between the radially inner edge of the seal member and the outer peripheral surface of the inner race.

The rolling bearing unit of the present invention further includes protrusions disposed on the radially inner edge of the circular annular seal member covering the side opening of the bearing space, and kept in sliding contact with the radially outer surface of the inner race. Therefore, it is possible to appropriately manage the dimension of the final gap (radial gap) between the radially inner edge of the seal member and the outer peripheral surface of the inner race.

The rolling bearing unit of the present invention includes a circular annular seal member attached to the stationary bearing race, and covering the side opening of the bearing space; a foreign object catching portion mounted to the lower portion of the circular annular seal member; and a sensor device mounted to the foreign object catching portion, and configured to detect foreign objects contained in lubricating oil. The foreign objects contained in lubrication oil fall to the foreign object catching portion by their own weight, and are received therein. The sensor device detects the foreign objects which have fallen to the foreign object catching portion by their own weight, thereby reliably detecting the amount of the foreign objects contained in lubrication oil. Especially, for example, if the rolling bearing unit is used in a device which does not continuously operate around the clock, e.g., a device which operates at night, but operates in the daytime, it is possible to make foreign objects effectively fall to the foreign object catching portion while the rolling bearings are not rotating, and thus possible for the sensor device to reliably detect foreign objects.

Since the circular annular seal member comprises a plurality of circumferentially divided seal member parts coupled together as a circular annular coupled member by the coupling pieces, and the foreign object catching portion is mounted to one of the coupling pieces, the sensor device configured to detect foreign objects can have a simple structure, and be mounted to one of the rolling bearings of the rolling bearing unit.

BEST MODE FOR CARRYING OUT THE INVENTION

Figure 1A:
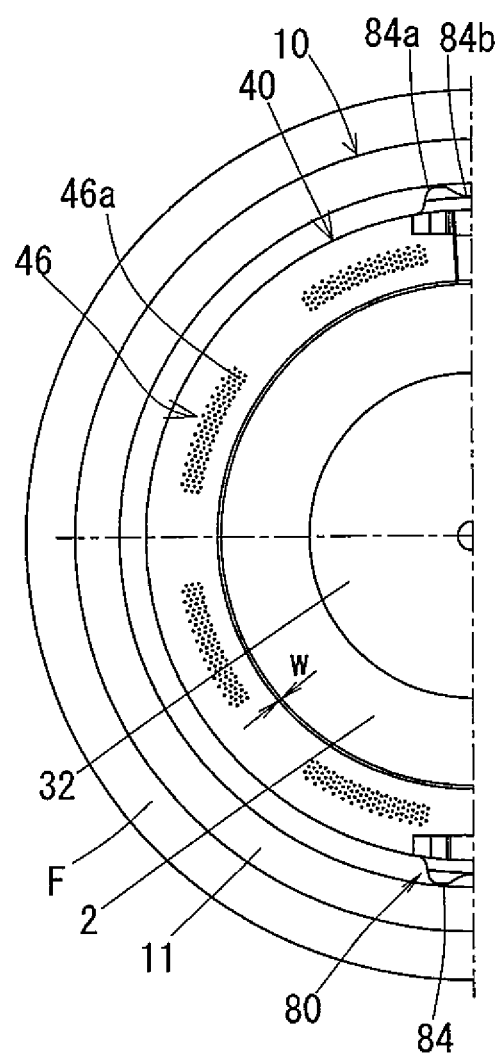
FIG. 1A is a side view of a bearing unit according to a first embodiment of the present invention, the bearing unit including a plurality of rolling bearings.

Embodiments of the present invention are described below with reference to the drawings. Each of the embodiments is directed to an oil pump device 10 including an oil pump 60, and a bearing unit 20 to which a seal member 40 is attached. FIGS. 1A to 7D illustrate the pump device 10 of a first embodiment.

The bearing unit 20 of this oil pump device 10 is disposed in the interior of the oil pump device 10, and includes a plurality of rolling bearings. The oil pump 60 includes an operation mechanism 30.

The plurality of rolling bearings of the bearing unit 20 comprises three rolling bearings 21, 22 and 23 arranged in juxtaposition with each other in a housing 11, and lubricated by oil. A shaft member 32 is connected to the operation mechanism 30 of the oil pump 60 and supported by the rolling bearings 21, 22 and 23 so as to be rotatable about the center axis of the shaft member 32 relative to the (fixed) housing 11.

Each of the rolling bearings 21, 22 and 23 includes an outer race 1 having a raceway surface 1a; an inner race 2 having a raceway surface 2a; rolling elements 3 disposed between the raceway surface 1a of the outer race 1 and the raceway surface 2a of the inner race 2; and a retainer 4 retaining the rolling elements 3 in the circumferential direction.

The outer race 1 is press-fitted and fixed to the radially inner surface of the housing 11 so as to be non-rotatable relative to the housing 11. The inner race 2 is press-fitted and fixed to the outer periphery of the shaft member 32 so as to be non-rotatable relative to the shaft member 32.

While, in the embodiment, tapered roller bearings including tapered rollers as the rolling elements 3 are used as the rolling bearings 21, 22 and 23, rolling bearings other than tapered roller bearings may be used. Also, while three rolling bearings are used in the embodiment, the number of rolling bearings arranged in juxtaposition in the housing 11 is not limited to three, and may be freely altered in accordance with the specifications of the device.

The operation mechanism 30 of the oil pump 60 includes a pump rotor (not shown) rotatably mounted in a pump casing so as to send lubricating oil into a lubrication path. The rotor is connected to a connection member 31 disposed on the end of the shaft member 32 so as to be rotatable about the center axis of the shaft member 32. A driving force is input to the rotor from a driving source (not shown).

Figure 1B:
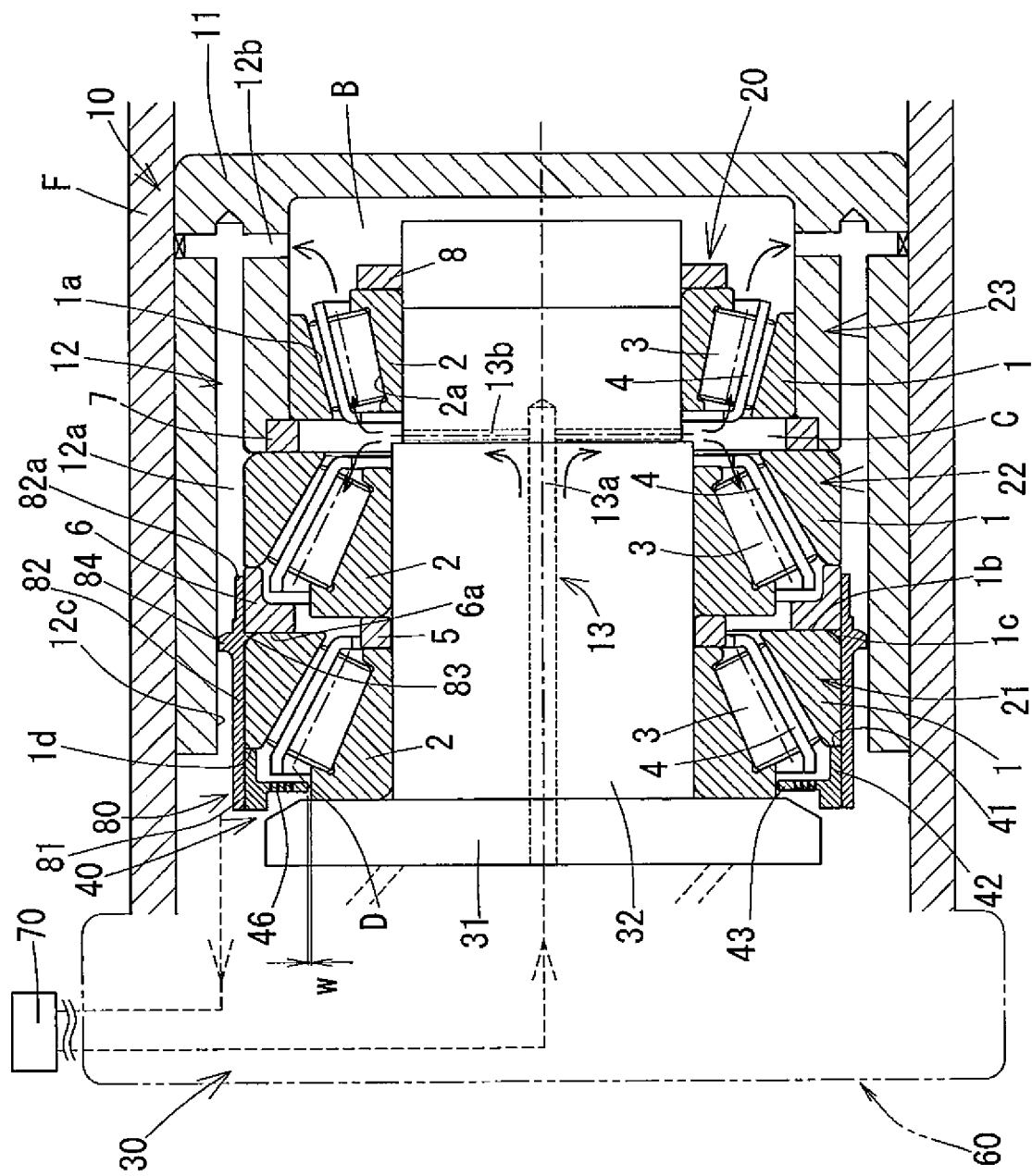
FIG. 1B is a vertical sectional view of the bearing unit according to the first embodiment of the present invention.
Figure 2A:
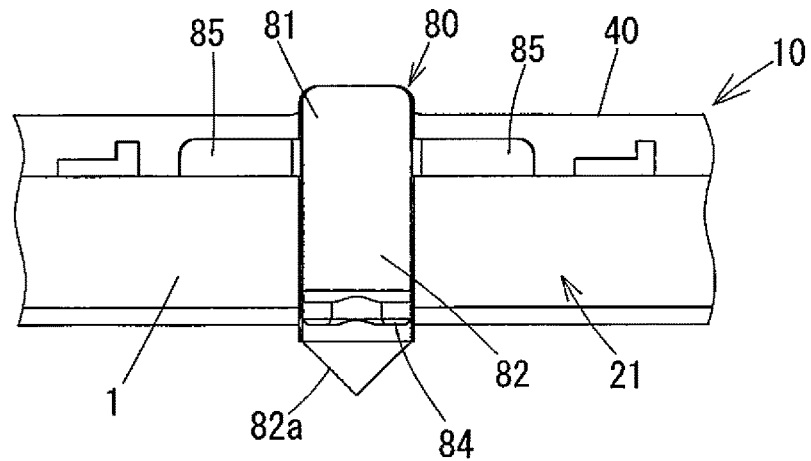
FIG. 2A is a plan view of a portion of one of the rolling bearings which includes a seal member.
Figure 2B:
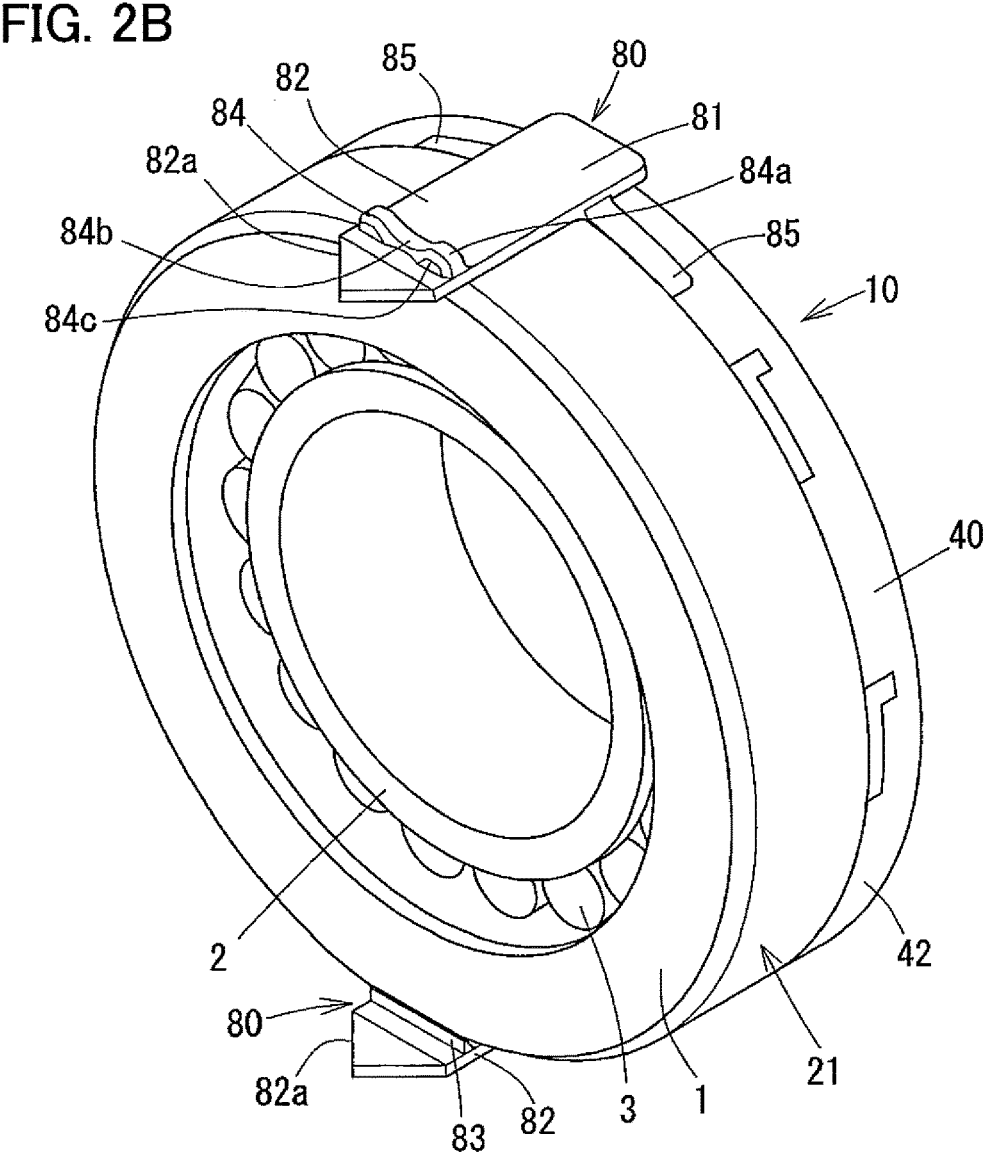
FIG. 2B is a perspective view of the one rolling bearing.
Figure 3A:
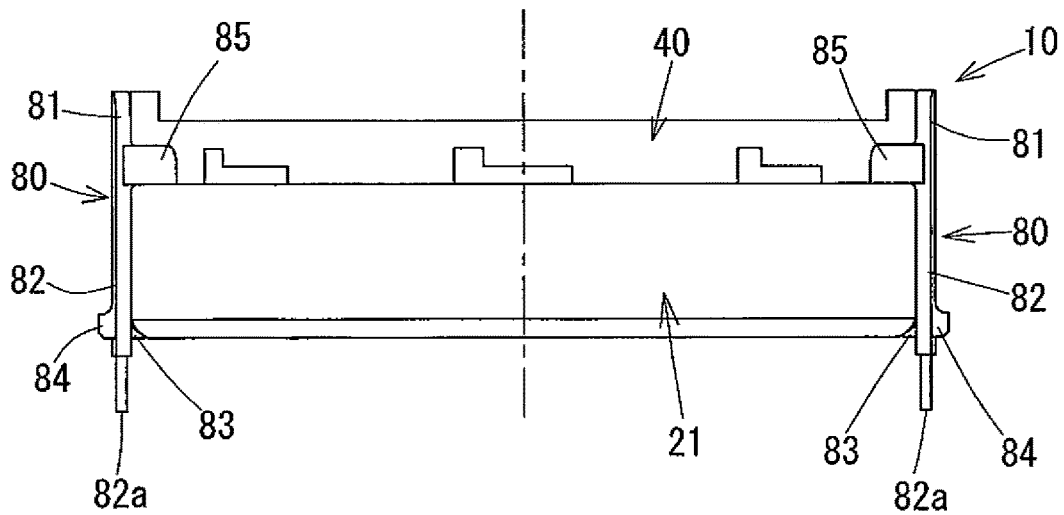
FIG. 3A is a side view of the one rolling bearing.
Figure 3B:
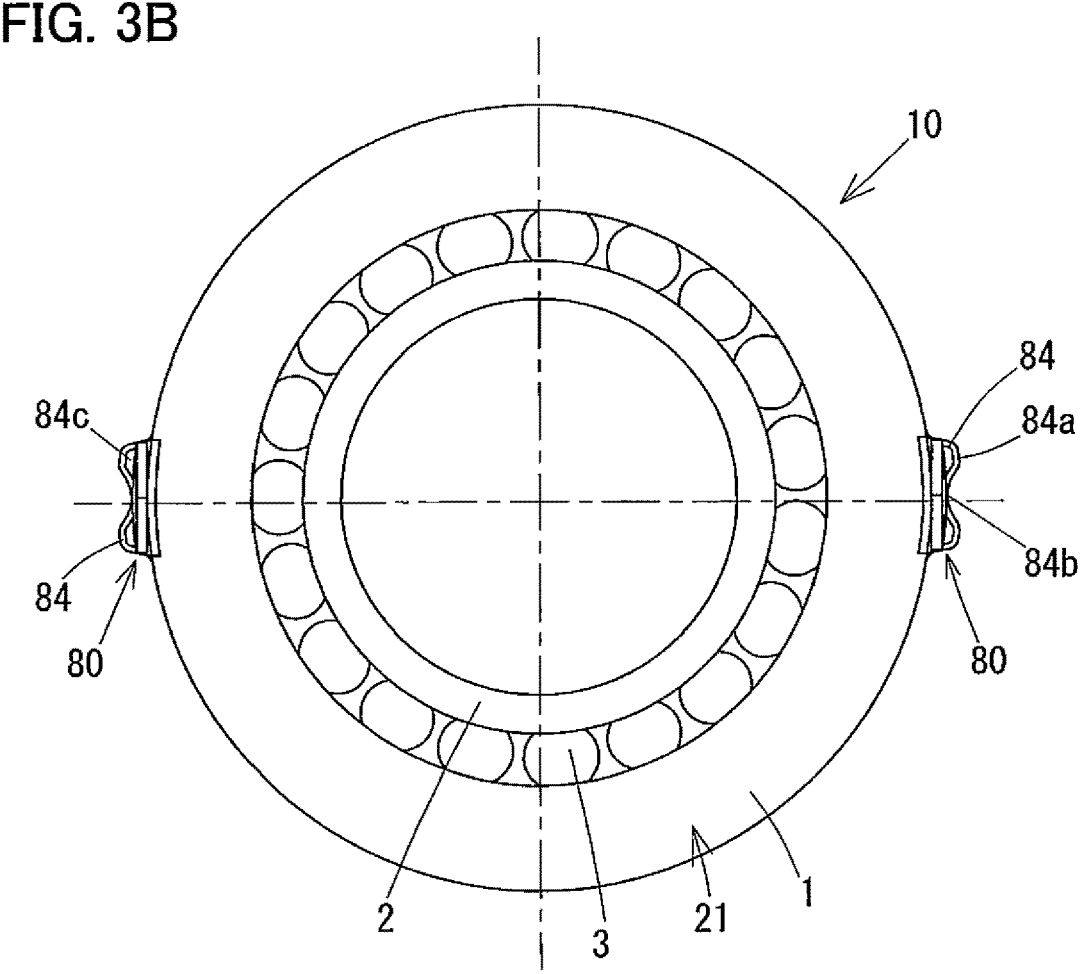
FIG. 3B is a front view of the one rolling bearing.
Figure 4:
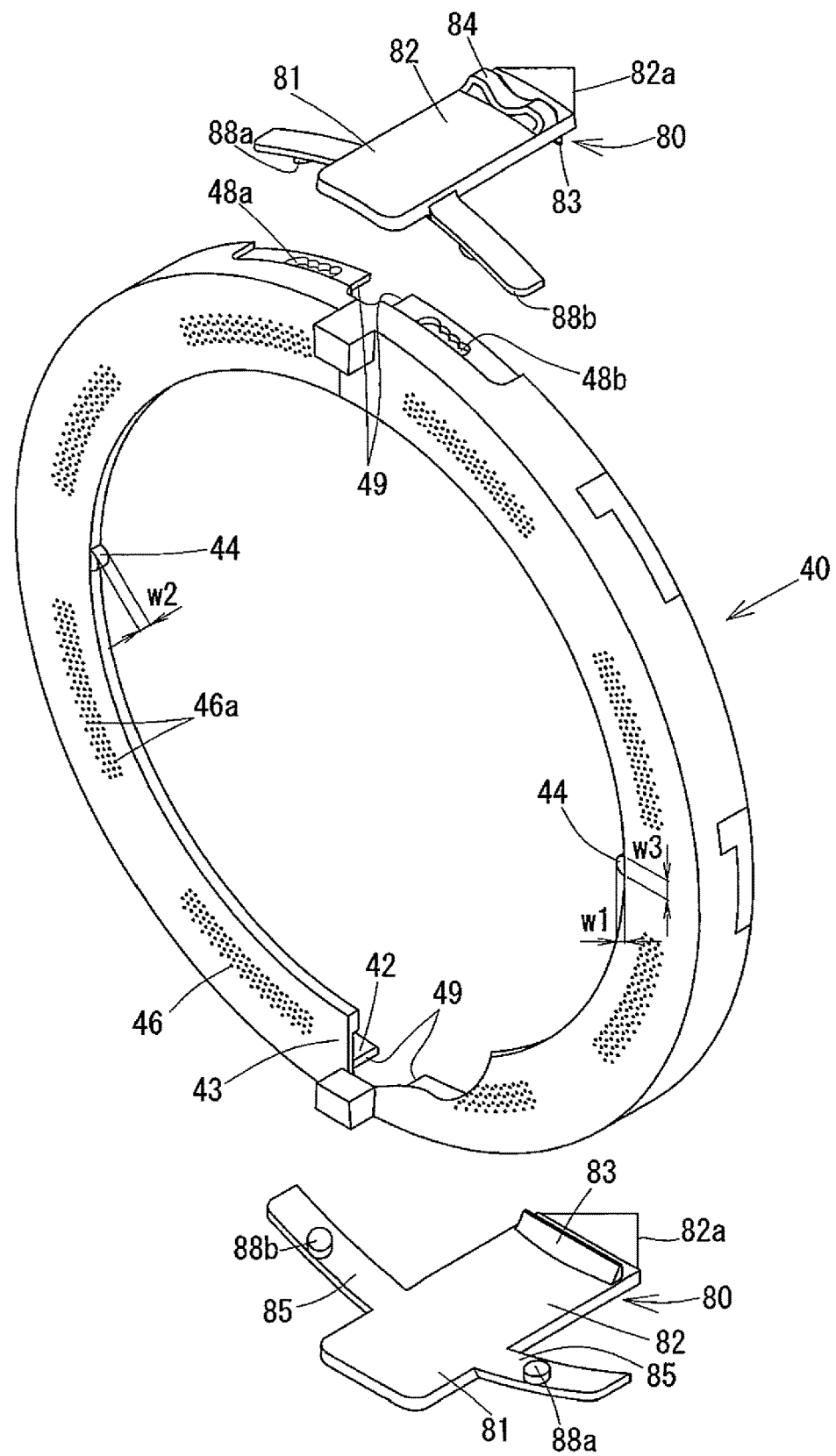
FIG. 4 is an exploded perspective view of the seal member.

As illustrated in FIGS. 1A and 1B, among the three rolling bearings 21, 22 and 23, the rolling bearings 21 and 22, which are located closer to one axial end of the device 10, i.e., closer to the operation mechanism 30, than is the rolling bearing 23, are arranged such that the small-diameter end surfaces of the tapered rollers of the rolling bearings 21 and 22 face toward the other axial end of the device 10 opposite from the one axial end thereof, i.e., opposite from the operation mechanism 30.

The other rolling bearing 23, which is located closest to the other axial end of the device 10, i.e., remotest from the operation mechanism 30, is arranged such that the small-diameter end surfaces of the tapered rollers of the rolling bearing 23 face toward the operation mechanism 30. Namely, the rolling bearings 21 and 22 are arranged in a back-to-back relationship with the rolling bearing 23, which means that the small-diameter end surfaces of the tapered rollers of the bearings 21 and 22 face the small-diameter end surfaces of the tapered rollers of the bearing 23. Therefore, the rolling bearings 21 and 22, located closer to the one axial end of the device, are each arranged such that the distance between the raceway surface 1a of the outer race 1 and the raceway surface 2a of the inner race 2 decreases toward the other axial end of the device, whereas the rolling bearing 23, closest to the other axial end of the device, is arranged such that the distance between the raceway surface 1a of the outer race 1 and the raceway surface 2a of the inner race 2 increases toward the other axial end of the device.

As illustrated in FIG. 1B, spacers 5 and 6 are disposed between the axially adjacent rolling bearings 21 and 22, and a spacer 7 is disposed between the axially adjacent rolling bearings 22 and 23.

Specifically, the spacer 5 is disposed between the radially inner portions of the rolling bearings 21 and 22 so as to abut against the end surfaces of the inner races 2 of the rolling bearings 21 and 22. The spacer 6 is disposed between the radially outer portions of the rolling bearings 21 and 22 so as to abut against the end surfaces of the outer races 1 of the rolling bearings 21 and 22.

The spacer 7 is disposed between the radially outer portions of the rolling bearings 22 and 23 so as to abut against the end surfaces of the outer races 1 of the rolling bearings 22 and 23. Though not illustrated in FIG. 1B, an additional spacer is disposed between the radially inner portions of the rolling bearings 22 and 23 so as to abut against the end surfaces of the inner races 2 of the rolling bearings 22 and 23. This additional spacer extends along the circumferential direction of the rolling bearings 22 and 23 so as not to close radially outer openings of radial lubrication path portions 13b for lubricating oil.

The rolling bearing 21, closest to the one axial end of the device 10, is fixed in position, at one end thereof close to the one axial end of the device 10, by the end surface of the (flange-shaped) connection member 31 on the end of the shaft member 32, and the rolling bearing 23, closest to the other axial end of the device 10, is fixed in position, at one end thereof close to the other axial end of the device 10, by the end surface of a presser 8 such that the rolling bearings 21, 22 and 23 are axially unmovable relative to the shaft member 32. By fixing the rolling bearings (tapered roller bearings) with the connection member 31 and the presser 8, a preload is applied to the respective rolling bearings.

The shaft member 32, which is supported by the housing 11 through the rolling bearings 21, 22 and 23, is connected to the operation mechanism 30, which is a rotary member of the oil pump 60 for sending out oil. When driven, the oil pump 60 sends lubricating oil contained in the oil pump toward an external operation mechanism 70. The lubricating oil sent out of the oil pump flows through a lubricating oil path, lubricates the operation mechanism 70, and then returns to the oil pump 60.

The oil pump 60 is configured such that common lubricating oil lubricates both the operation mechanism 30 of the oil pump 60 and the bearing unit 20, which supports the shaft member 32, which is connected to the operation mechanism 30. The operation mechanism 30 of the oil pump 60 and the bearing space of the bearing unit 20 communicate with each other through the side opening D (i.e., the side opening close to the one axial end of the device 10) of the bearing space of the rolling bearing 21 (i.e., the bearing closest to the one axial end of the device 10); and circulation paths 12 and 13 through which lubricating oil circulates. This lubricating oil is also sent to the external operation mechanism 70.

In the embodiment, the circulation path 13 comprises an axial lubrication path portion 13*a* axially extending from the oil pump such that the center axis of the path portion 13*a* is located on the center axis of the shaft member 32; and the above-mentioned radial lubrication path portions 13*b*, which extend radially outwardly from the end of the axial lubrication path portion 13*a*, and open to the outer peripheral surface of the shaft member 32. The radial lubrication path portions 13*b* open to or communicate with an annular space C defined between the rolling bearings 22 and 23. Therefore, the circulation path 13 communicates, through the annular space C, with the bearing spaces of the rolling bearings 21 and 22 on the one axial side including the one axial end of the device 10 (left side of FIG. 1B), and with the bearing space of the rolling bearing 23 on the other axial side including the one axial end of the device 10 (right side of FIG. 1B).

The lubricating oil which has passed through the annular space C, and reached the bearing space of the rolling bearing 23 flows, through the opening (close to the other axial end of the device 10) of the bearing space of the rolling bearing 23, into a housing end space B defined between the other axial end of the rolling bearing 23 and the housing 11. Thereafter, the lubricating oil flows through the circulation paths 12, which are disposed in the radially outer portion of the housing 11, and returns to the operation mechanism 30 of the oil pump 60.

Each circulation path 12 comprises a radial lubrication path portion 12*b* extending radially outwardly from the housing end space B; and an axial lubrication path portion 12*a* axially extending parallel to the center axis of the shaft member 32 from the radial circulation path portion 12*b*.

The lubricating oil which has passed through the annular space C and the bearing space of the rolling bearing 22, and reached the bearing space of the rolling bearing 21 returns, through the side opening D (close to the one axial end of the device 10) of the bearing space of the rolling bearing 21, to the operation mechanism 30.

In this way, the operation mechanism 30 of the oil pump, and the rolling bearings 21, 22 and 23 of the bearing unit 20 are lubricated by common lubricating oil.

Foreign objects such as wear dust (e.g., iron dust) might occur in the bearing spaces of the rolling bearings 21, 22 and 23. It is not preferable that such foreign objects enters the operation mechanism 30 of the oil pump 60 and the external operation mechanism 70, which is located along the circulation path outside of the oil pump. In order to prevent such foreign objects from entering these mechanisms, the seal member 40 is attached to the side opening D (located close to the one axial end of the device 10) of the bearing space of the rolling bearing 21, and the openings 12C (located close to the one axial end of the device 10) of the axial lubrication path portions 12*a* (since the seal member 40 of each of this and the below-described other embodiments is a circular annular one, it is hereinafter referred to as the "seal ring 40").

The seal ring 40 is attached to the housing 11 and the outer race 1 of the rolling bearing 21 so as to cover the side opening D of the rolling bearing 21 and the openings 12C of the circulation paths 12. The side opening D is an annular one defined along the raceway surfaces 1*a* and 2*a* of the outer and inner races 1 and 2 of the rolling bearing 21. Therefore, the seal ring 40, which covers the annular side opening D, is also an annular one.

As illustrated in FIGS. 1A to 3B, with the seal ring 40 kept in abutment with the end surface of the rolling bearing 21, the rolling bearing 21 is received in the housing 11 together with the other rolling bearings 22 and 23 and the spacers 5, 6, and 7.

As illustrated in FIG. 1B, the seal ring 40 includes cylindrical portions 42 comprising a cylindrical member, and having an axial end surface 41 abutting against the end surface 1*d* (close to the one axial end of the device 10) of the outer race 1 of the rolling bearing 21 at the one axial end thereof; and wall portions 43 extending radially inwardly from the axial ends (close to the one axial end of the device 10) of the cylindrical portions 42.

The wall portions 43 include filters 46 each comprising filter holes 46*a* in the form of through holes, and configured to prevent foreign objects in the bearing spaces of the rolling bearings 21 and 22 from passing through the filters 46, while allowing lubricating oil to pass through the filter 46. The diameters of the filter holes 46*a* are appropriately set such that foreign objects which will not adversely affect the operation mechanism 30 even if it enters the operation mechanism 30 is allowed to pass through the filter holes 46*a*.

In the embodiment, the seal ring 40 is made of a synthetic resin. Also, the seal ring 40 is a circular annular coupled member extending along the side opening D of the bearing space of the rolling bearing 21, and constituted by a plurality of circumferentially divided seal member parts 40' circumferentially adjacent to each other, and coupled together by coupling pieces 80 made of a synthetic resin.

In the specific example shown, the divided seal member parts 40' of the circular annular seal ring 40 comprise two divided seal member parts 40' each having a central angle of 180 degrees. Thus, the coupling pieces 80 comprise two coupling pieces 80 located at upper and lower portions of the seal ring 40, respectively.

However, instead of constituting the circular annular seal ring 40 with two divided seal member parts 40' each having a central angle of 180 degrees, the circular annular seal ring 40 may be constituted, for example, by four divided seal member parts 40' each having a central angle of 90 degrees, or by six divided seal member parts 40' each having a central angle of 60 degrees.

While, in the embodiment, the filter holes 46a, which constitute the filters 46, are directly formed in the body of the seal ring 40, i.e., in the wall portions 43, the filters 46 may be separate filters fixed to the body of the seal ring 40 by fitting, embedding, bonding, etc.

The seal ring 40 and the coupling pieces 80 may be made of a material other than resin, such as metal or rubber. If separate filters are used as the filters 46, the separate filters may be also made of a material other than resin, such as metal or rubber.

Each coupling piece 80 includes a base portion 81 abutting against the radially outer surfaces of the cylindrical portions 42 of the seal member 40, and an axial member 82 axially extending from the base portion 81 toward the rolling bearing 21.

The axial members 82 of the respective coupling pieces 80 axially extend toward the rolling bearing 21 while passing through the space between the radially inner surface of the housing 11 and the radially outer surface of the outer race 1 of the rolling bearing 21, and engage with a bearing part, such as a spacer or a bearing race, so that the seal member 40 is fixed to the housing 11 and the outer race 1 of the rolling bearing 21.

In the embodiment, the axial member 82 of each coupling piece 80 axially extends through the corresponding circulation path 12 toward the other axial end of the device 10, and has a tapered distal end 82a, which allows smooth insertion of the axial member 82 into the housing 11. The axial member 82 includes a radially inner side protrusion 83 located close to the distal end 82a, and extending inwardly in the radial direction.

The coupling pieces 80 are configured such that, with the axial members 82 kept in contact with the radially outer surface of the outer race 1 of the rolling bearing 21, the radially inner side protrusions 83 are fitted or engaged in a recess of a bearing race or a spacer, thereby restricting the axial movements of the seal member 40. In the specific example shown, the radially inner side protrusions 83 are engaged in a recess 1c defined between the outer race 1b of the rolling bearing 21 and the spacer 6, by the end surface 6a of the spacer 6 at one end thereof, and a curved and rounded surface or a chamfer formed on the ridgeline of the shoulder on the outer race 1 of the rolling bearing 21.

The openings 12c (located close to the one axial end of the device 10) of the circulation paths 12 are located radially outwardly of the side opening D of the bearing space of the rolling bearing 21, which is circular annular in shape when seen from the axial side. While, in the embodiment, the axial lubrication path portions 12a comprise two axial lubrication path portions, and the openings 12c comprise two openings circumferentially arranged at an interval of 180 degrees, the openings 12 may comprise one opening or three or more openings as necessary.

Each coupling piece 80 includes a radially outer side protrusion 84 extending radially outwardly from the outer surface of the axial member 82 toward the inner surface of the circulation path 12, and including protruding portions 84a and a recessed portion 84b on the radially outer surface of the protrusion 84, and oil passage holes 84c. The protruding portions 84a of the radially outer side protrusion 84 support the coupling piece 80 while kept in abutment with the inner surface of the circulation path 12. Through the oil passage holes 84c and the gap between the recessed portion 84b and the inner surface of the circulation path 12, lubricating oil flows from the circulation path 12 to the exterior of the bearing space of the rolling bearing 21. The diameters of the oil passage holes 84c and the gap between the recess 84b and the inner surface of the circulation path 12 are set to be equal to or less than the mesh size of the filters 46. The radially outer side protrusion 84 may be formed with a plurality of through holes or slits as a filter for catching foreign objects.

The axial members 82 and the radially outer side protrusions 84 of the coupling pieces 80 are equal in width (in the circumferential direction of the rolling bearings) to the respective circulation paths 12 so as to be firmly (unmovably) fixed in position after inserted into the circulation paths 12. This rotationally fixes the seal rings 40 to the housing 11 and the outer race 1 of the rolling bearing 21. In this way, the axial members 82 and the radially outer side protrusions 84 of the coupling pieces 80 function as an anti-rotation means for the seal ring 40.

Figure 5A:
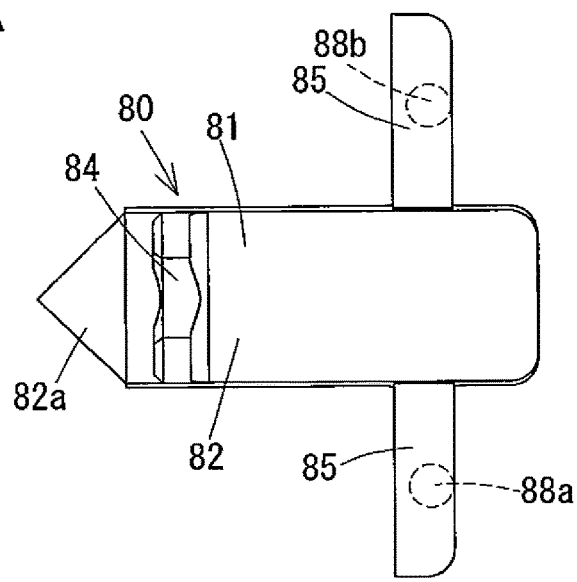
FIG. 5A is a plan view of one of coupling pieces coupling divided seal member parts together.
Figure 5B:
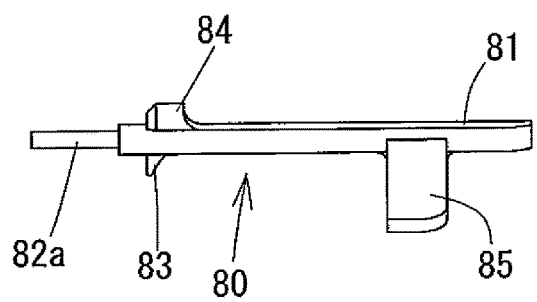
FIG. 5B is a front view of the one coupling piece.
Figure 5C:
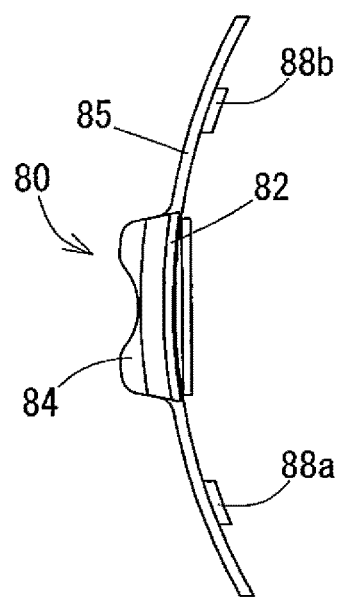
FIG. 5C is a right side view of the one coupling piece.

As illustrated in FIGS. 5A to 5C, each coupling piece 80 includes a pair of supporting portions 85 having cylindrical surfaces and extending in the respective opposite circumferential directions from the base portion 81 along the radially outer surface of the seal ring 40.

Figure 6A:
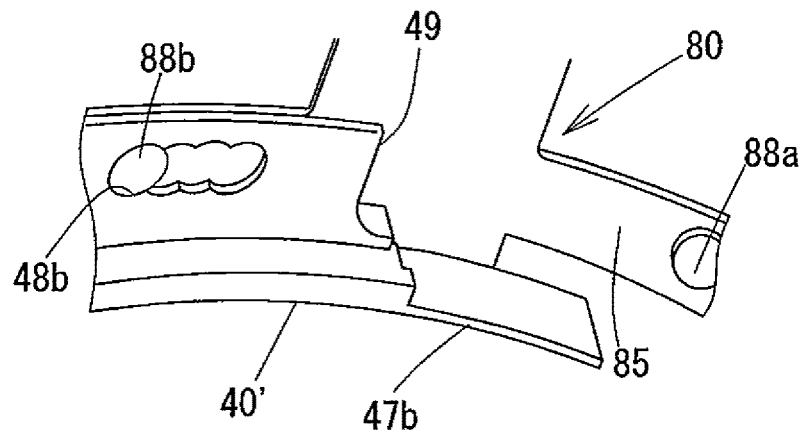
FIG. 6A is an enlarged view of connection portions of the divided seal member parts.
Figure 6B:
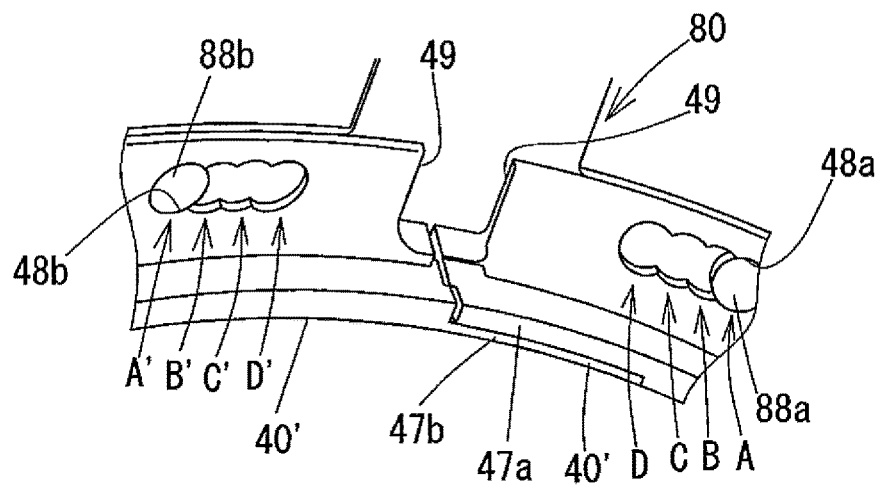
FIG. 6B is an enlarged view of the connection portions of the divided seal member parts.

As illustrated in FIGS. 6A and 6B, the pair of supporting portions 85 of each coupling piece 80 include, at the respective distal ends thereof, a pair of engagement protrusions 88a and 88b as a pair of radially inwardly extending engaged portions 88. The (circumferentially adjacent) divided seal member parts 40' include, at each opposed pair of ends thereof, a pair of engagement holes 48a and 48b as a pair of engaging portions 48. By engaging the pairs of engagement protrusions 88a and 88b of the respective coupling pieces 80 in the respective pairs of engagement holes 48a and 48b, the coupling pieces 80 couple the opposed pairs of ends of the divided seal member parts 40' to each other, so that the divided seal member parts 40' are coupled together as the circular annular coupled member.

Figure 6C:
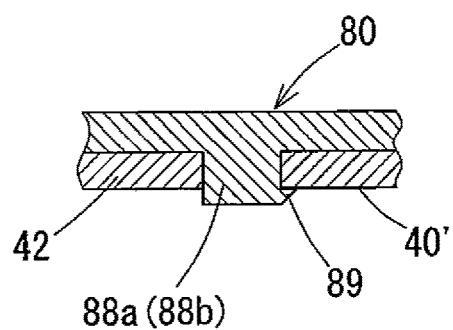
FIG. 6C is an enlarged view illustrating a modification of the connection portions of the divided seal member parts.

As illustrated in FIG. 6C, each engagement protrusion 88a, 88b may include, at its distal end, an anti-separation projection 89 engageable with the edge of the engagement hole 48a, 48b. The anti-separation projections 89 can reliably prevent the separation of the coupling pieces 80 from the respective divided seal member parts 40'. Alternatively, each engagement hole 48a, 48b may include such an anti-separation projection. In this case, an anti-separation recess needs to be disposed in each engagement protrusion 88a, 88b such that the anti-separation projection of the engagement hole 48a, 48b is fitted in the anti-separation recess.

The pair of engaged portions 88 of each coupling piece 80 and the corresponding pair of engaging portions 48 function as a distance adjusting means for adjusting the circumferential distance between the connection portions where the coupling piece 80 is connected to the respective (circumferentially adjacent) seal member part'40.

Figure 7A:
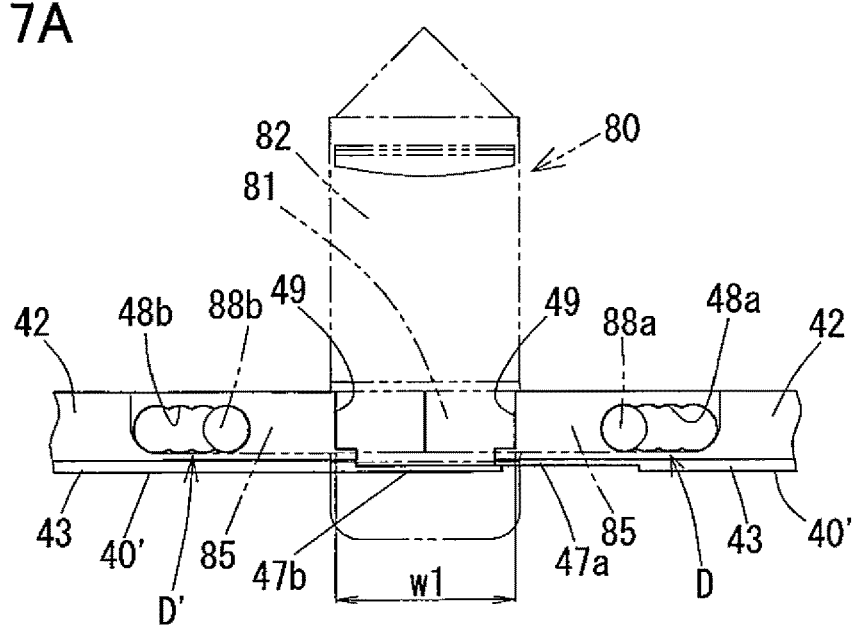
FIG. 7A is a plan view of the connection portions of the divided seal member parts having a large distance therebetween.
Figure 7B:
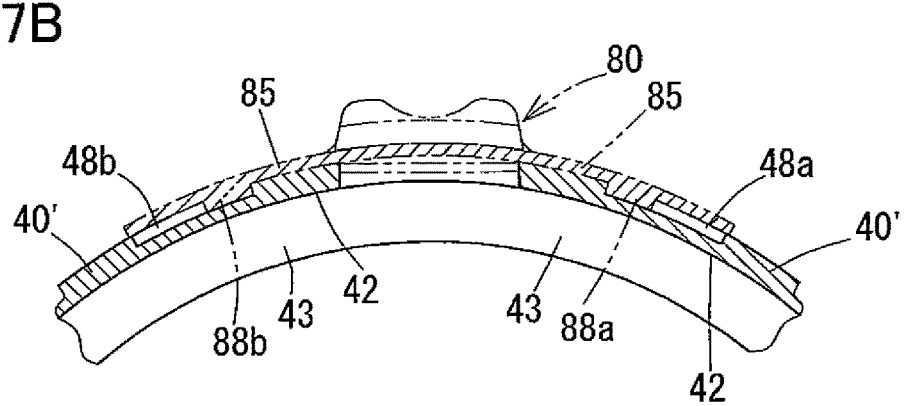
FIG. 7B is a sectional view of the connection portions of the divided seal member parts having a large distance therebetween.

As illustrated in FIGS. 7A and 7B, the pairs of engagement holes 48a and 48b are provided as the pairs of engaging portions 48 in the respective opposed pairs of circumferential ends of the divided seal member parts 40'. Each engagement hole 48a, 48b has a plurality of circumferentially arranged connection portions (in the example shown, each engagement hole 48a has four connection portions A, B, C, and D, and each engagement hole 48b has four connection portions A', B', C', and E') such that each engagement protrusion 88a, which is a columnar one having a circular section, can be connected to any one of the four connection portions A, B, C, D of the corresponding engagement hole 48a, whereas each engagement protrusion 88b, which is also a columnar one having a circular section, can be connected to any one of the four connection portions A', B', C', E' of the corresponding engagement hole 48b.

Therefore, by connecting the engagement protrusion 88a of either one of the coupling pieces 80 to any selected one of the four connection portions A, B, C, D of the corresponding engagement hole 48a, and connecting the engagement protrusion 88b of the same coupling piece 80 to any selected one of the four connection portions A', B', C', and D' of the corresponding engagement hole 48b, it is possible to adjust the circumferential distance between the connection portions at the opposed pair of ends of the divided seal member 40'.

As shown in FIGS. 7A and 7B, by connecting the engagement protrusions 88a and 88b of the coupling piece 80 to the connection portions D and D' of the engagement holes 48a and 48b, which are the closest to the respective opposed edges of the divided seal member parts 40', it is possible to ensure a wide circumferential distance w1 between the connection portions at the opposed pair of ends of the divided seal member parts 40'. This can widen the final gap w between the radially inner edges of the wall portions 43 of the seal ring 40 and the radially outer surface of the large-diameter flange of the inner race 2.

Figure 7C:
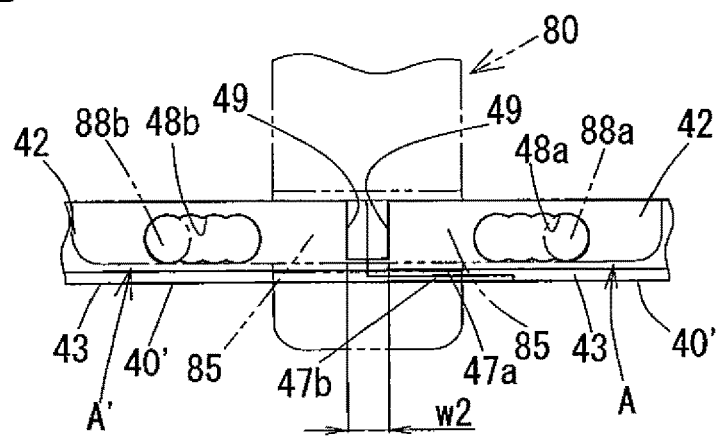
FIG. 7C is a plan view of the connection portions of the divided seal member parts having a small distance therebetween.
Figure 7D:
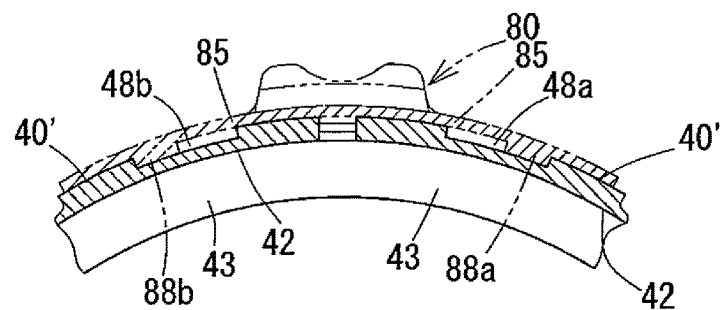
FIG. 7D is a sectional view of the connection portions of the divided seal member parts having a small distance therebetween.

As shown in FIGS. 7C and 7D, by connecting the engagement protrusions 88a and 88b of the coupling piece 80 to the connection portions A and A' of the engagement holes 48a and 48b, which are the remotest from the respective opposed edges of the divided seal member parts 40', it is possible to ensure a narrow circumferential distance w2 between the connection portions at the opposed pair of ends of the divided seal member parts 40'. This can narrow the final gap w between the radially inner edges of the wall portions 43 of the seal ring 40 and the radially outer surface of the large-diameter flange of the inner race 2.

As illustrated in FIGS. 6A and 6B, the wall portions 43 of the (circumferentially adjacent) divided seal member parts 40' include, at each opposed pair of ends of the wall portions 43, a pair of opposed stepped portions 47a and 47b meshing with each other, thereby enabling the divided seal member parts 40' to be more firmly coupled together. The stepped portions 47a and 47b are configured such that, irrespective of the circumferential distance between the connection portions of the divided seal member parts 40', a gap through which harmful foreign objects passes is never formed between the keys 47a and 47b. As a result, the stepped portions 47a and 47b prevent the formation of such a gap between the wall portions 43, irrespective of the circumferential distance between the connection portions.

The cylindrical portions 42 of the (circumferentially adjacent) divided seal member parts 40' may include second stepped portions similar to the stepped portions 47a and 47b and meshing with each other. The second stepped portions are also configured such that, irrespective of the circumferential distance between the connection portions of the divided seal member parts 40', a gap through which harmful foreign objects passes is never formed between the second stepped portions, so that the second stepped portions prevent the formation of such a gap between the cylindrical portions 42.

In the embodiment, if the cylindrical portions 42 include no stepped portions as described above, a gap in the form of a cutout 49 will be defined by each circumferentially opposed pair of edges of the cylindrical portions 42 of the (circumferentially adjacent) divided seal member parts 40'. However, since such a gap (cutout 49) is closed by the base portion 81 of the corresponding coupling piece 80, the stepped portions of the cylindrical portions 42 may be omitted.

The distance adjusting means adjusts the circumferential distance between the connection portions at each opposed pair of ends of the divided seal member parts 40' to which the coupling piece 80 is connected, thereby adjusting the diameter of the seal ring 40. This can appropriately adjust and manage the dimension of the final gap w between the radially inner edges of the wall portions 43 of the seal ring 40 and the radially outer surface of the large-diameter flange of the inner race 2.

As with the filter holes 46a of the filters 46, the final gap w, between the radially inner edges of the wall portions 43 and the radially outer surface of the large-diameter flange of the inner race 2, allows the passage of lubricating oil but prevents the passage of foreign objects larger in size than the dimension of the final gap. Thus, the dimension of the final gap w is set to be equal to or less than the mesh size of the filters 46 foreign objects.

While, in the embodiment, the engaged portions 88 comprise protrusions, and the engaging portions 48 comprise recesses in which the protrusions engage, the engaged portions 88 and the engaging portions 48 may comprise a combination other than the combination of protrusions and recesses.

While, in the embodiment, each distance adjusting means is constituted by the engaged portions 88 of one of the coupling pieces 80 and the corresponding engaging portions 48 of the divided seal member parts 40', and each engaging portion 48 includes a plurality of circumferentially arranged connection portions to which the corresponding engaged portion 88 can be connected, the engaged portions 88 and the engaging portions 48 may be reversely arranged.

Namely, each distance adjusting means may be constituted by engaging portions, such as recesses, disposed in one of the coupling pieces 80, and each including a plurality of circumferentially arranged connection portions; and engaged portions, such as protrusions, disposed at the corresponding opposed pair of ends of the divided seal member parts 40' such that the engaged portions of the divided seal member parts 40' are engaged in the engaging portions of the coupling piece 80.

Also, by preparing a plurality of coupling pieces 80 of which the distances between the respective engaged portions 88 are different from each other; and selectively using any of the plurality of coupling pieces 80, it is possible to constitute each space adjusting means for adjusting the circumferential distance between the connection portions at the opposed pair of ends of the (circumferentially adjacent) divided seal member parts 40 to which the coupling piece 80 is connected. Namely, it is possible to increase the circumferential distance between the connection portions by using a coupling piece 80 of which the distance between the engaged portions 88 is large, and to reduce the circumferential distance between the connection portions by using a coupling piece 80 of which the engaged portions 88 are spaced apart a shorter distance.

Thus, the lubricating oil from the bearing spaces of the rolling bearings 21, 22 and 23 flows out of the bearings after passing through the filter holes 46a of the filters 46 of the seal ring 40, the holes and the gaps of the circulation paths 12, and the gap w between the radially inner edges of the wall portions 43 and the radially outer surface of the large-diameter flange of the inner race 2. Therefore, large foreign objects that could adversely affect the operation of the operation mechanisms 30 and 70 (such as metal wear dust, and particularly flakes) are prevented from entering the operation mechanisms 30 and 70.

In the embodiment, a sensor device may be attached to the portion of the seal ring 40 close to one or more than one filter hole 46a of one of the filters 46 so as to detect the adhesion of foreign objects such as metal dust. As such a sensor device, for example, an electric sensor device may be used which is configured to detect the existence of foreign objects between a pair of electrodes based on a change in electrical output when the foreign objects cause a short-circuit between the pair of electrodes.

For example, such an electric sensor device includes an output detector connected through a cable to the pair of electrodes and configured to detect a change in electric output when the pair of electrodes are electrically connected to each other through foreign objects comprising metal and too large to pass through the filter holes 46a of the filter 46, and thus adhering between the pair of electrodes, thereby detecting the state (amount) of metallic foreign objects contained in lubricating oil. The cable connected to the pair of electrodes extends through a substrate to the outside of the housing 11, and is connected to the output detector outside the housing 11. A sensor hole through which the cable extends to the outside of the seal ring 40 may be disposed in one of the cylindrical portions 42 or one of the wall portions 43.

FIGS. 8A to 14C illustrate the oil pump device according to the second embodiment of the present invention. The device of the second embodiment, illustrated in FIGS. 8A to 11, is similar in basic structure to the device of the first embodiment, illustrated in FIGS. 1A to 4. Therefore, the features of the device of the second embodiment different from the features of the device of the first embodiment are mainly described below, and its common features are not described again.

Figure 12A:
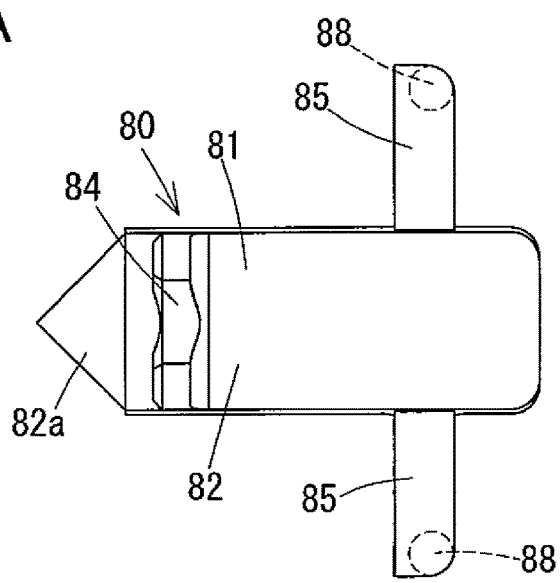
FIG. 12A is a plan view of one of coupling pieces coupling divided seal member parts together.
Figure 12B:
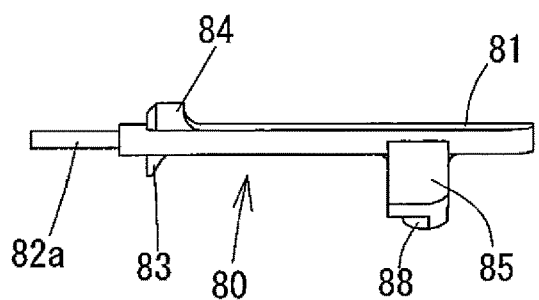
FIG. 12B is a front view of the one coupling piece.
Figure 12C:
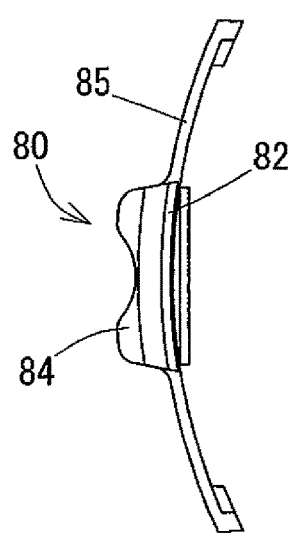
FIG. 12C is a right side view of the one coupling piece.

As illustrated in FIGS. 12A to 12C, each coupling piece 80 includes a pair of supporting portions 85 having a cylindrical surface and extending in the respective opposite circumferential directions from the base portion 81 along the radially outer surface of the seal ring 40. The supporting portions 85 include, at the respective distal ends thereof, a pair of radially inwardly extending engagement protrusions 88. The (circumferentially adjacent) divided seal member parts 40' include, at each opposed pair of ends thereof, a pair of engagement holes 48. By engaging the pairs of engagement protrusions 88 of the respective coupling pieces 80 in the respective pairs of engagement holes 48, the coupling pieces 80 couple the opposed pairs of ends of the divided seal member parts 40' to each other, so that the divided seal member parts 40' are coupled together as a circular annular coupled member.

Figure 13A:
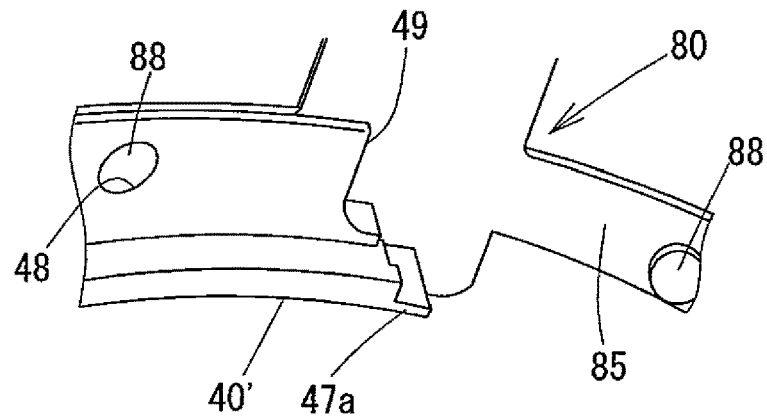
FIG. 13A is an enlarged view of connection portions of the divided seal member parts.
Figure 13B:
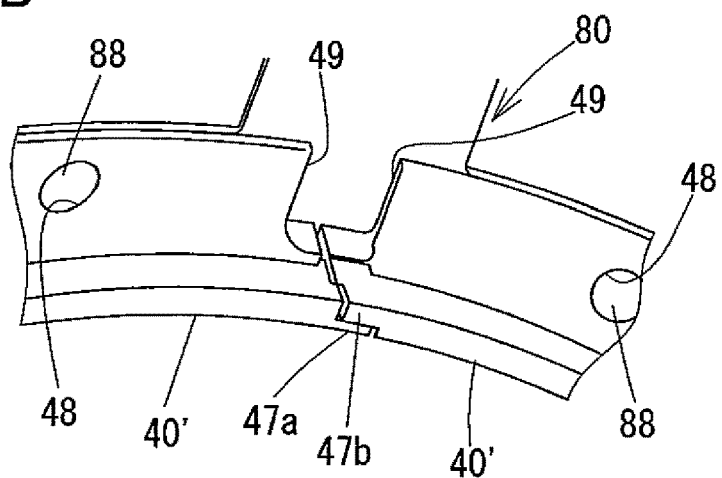
FIG. 13B is an enlarged view of the connection portions of the divided seal member parts.

As illustrated in FIGS. 13A and 13B, the wall portions 43 of the (circumferentially adjacent) divided seal member parts 40' include, at each opposed pair of ends of the wall portions 43, a pair of opposed stepped portions 47a and 47b meshing with each other, thereby enabling the opposed pairs of ends of the divided seal member parts 40' to be more firmly coupled together.

The radially inner edges of the wall portions 43 of the seal member 40 are opposed to the radially outer surface of the large-diameter flange of the inner race 2 through a minute gap w (final gap) defined therebetween, thereby forming a labyrinth seal structure between the wall portions 43 and the inner race 2. The minute gap w allows the passage of lubricating oil but prevents the passage of foreign objects larger in size than the minute gap w. The gap w is set to be equal to or less than the mesh size of the filters 46.

Thus, the lubricating oil from the bearing spaces of the rolling bearings 21, 22 and 23 flows out of the bearings after passing through the filter holes 46a of the filters 46 of the seal ring 40, the holes and the gaps of the circulation paths 12, and the minute gap w between the radially inner edges of the wall portions 43 and the radially outer surface of the large-diameter flange of the inner race 2. Therefore, large foreign objects that could adversely affect the operation of the operation mechanisms 30 and 70 (such as metal wear dust, and particularly flakes) are prevented from entering the operation mechanisms 30 and 70.

Figure 8A:
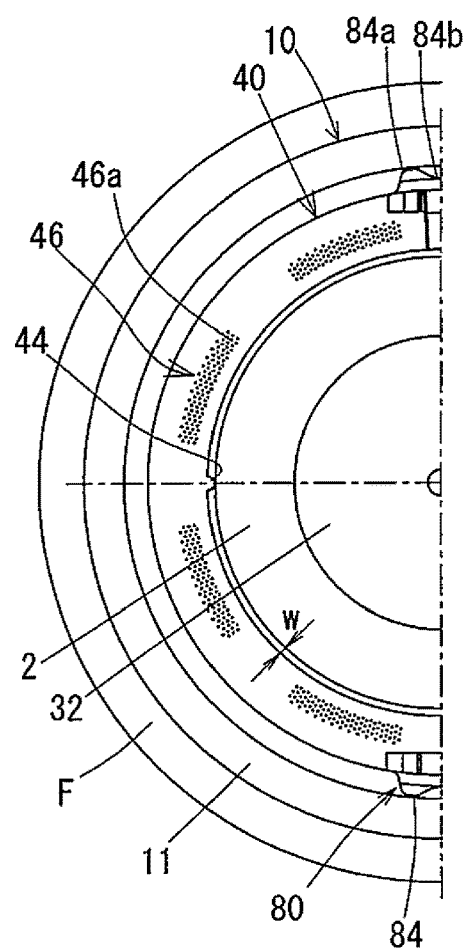
FIG. 8A is a side view of a bearing unit according to a second embodiment of the present invention, the bearing unit including a plurality of rolling bearings.
Figure 8B:
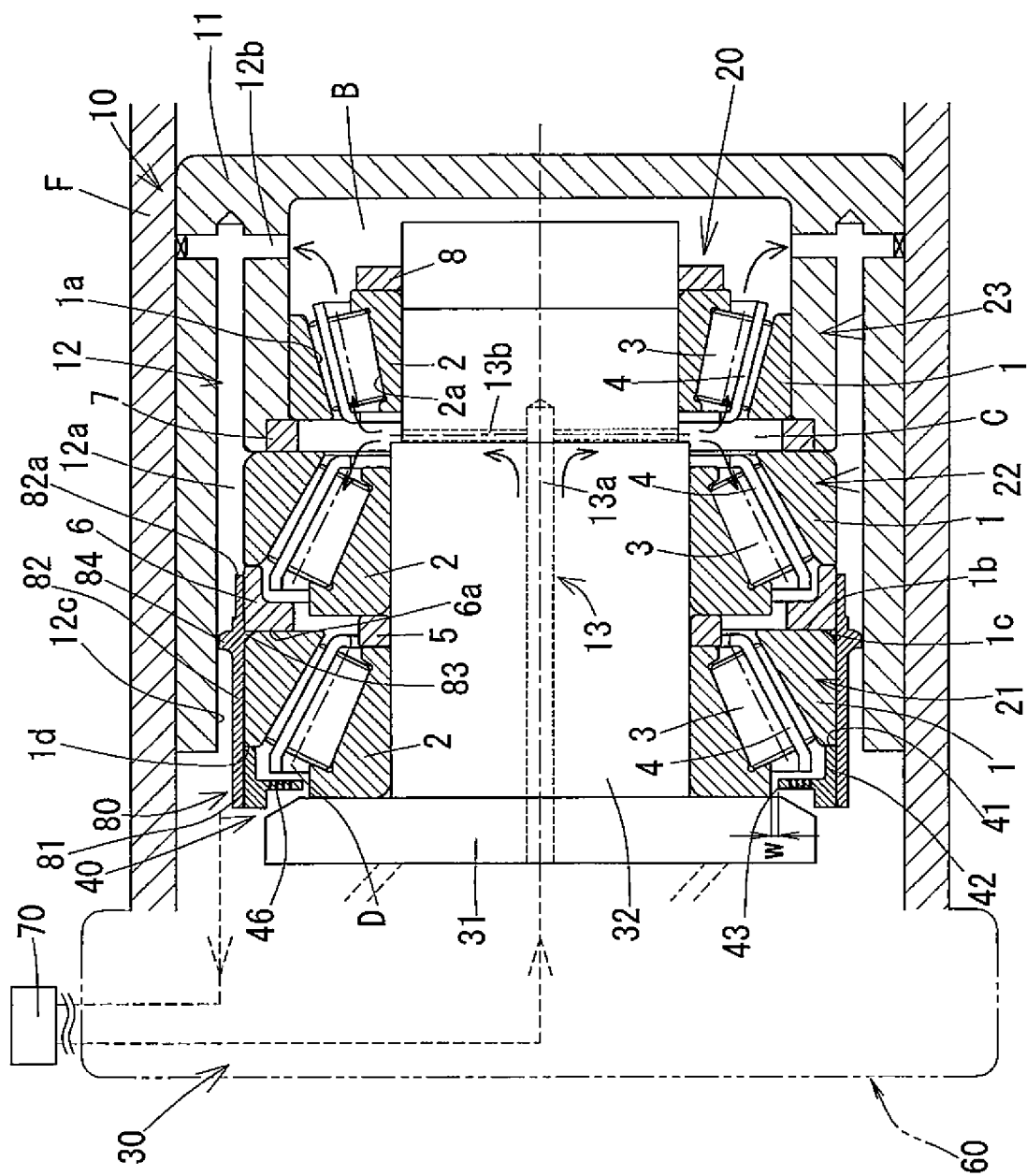
FIG. 8B is a vertical sectional view of the bearing unit according to the second embodiment of the present invention.
Figure 9A:
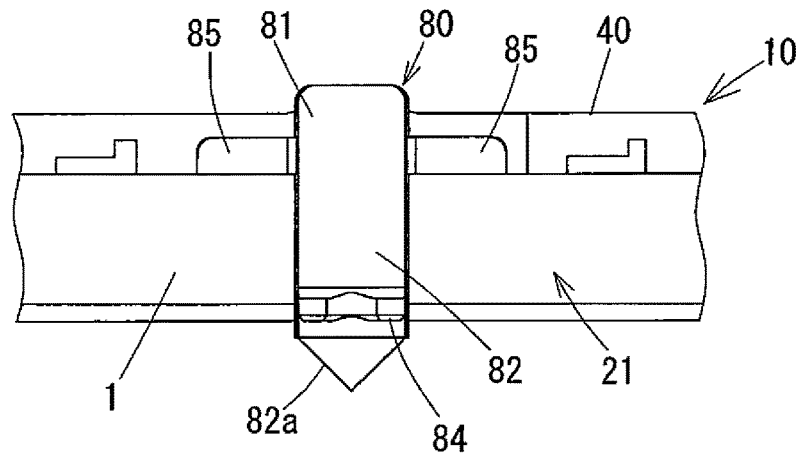
FIG. 9A is a plan view of a portion of one of the rolling bearings which includes a seal member/ring.
Figure 9B:
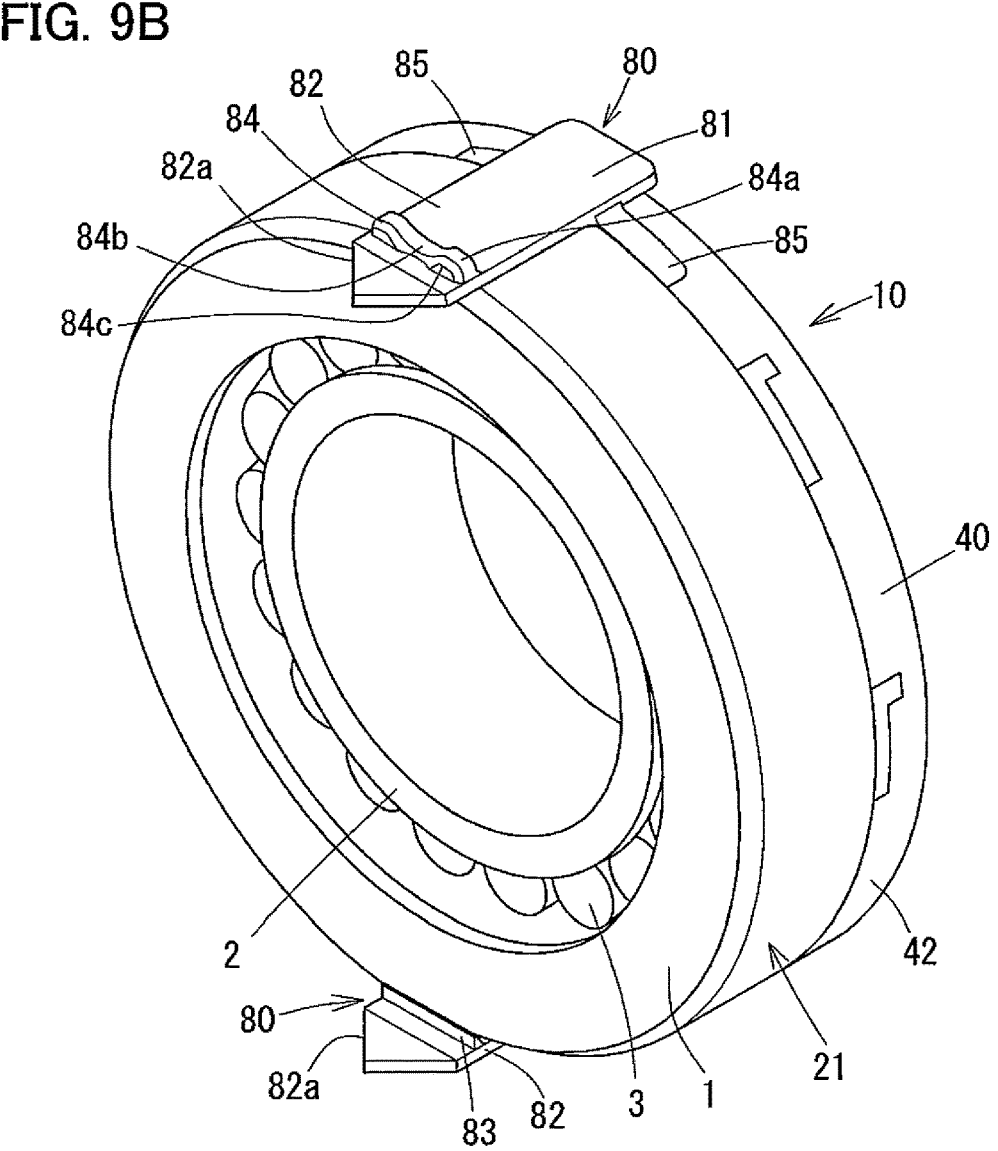
FIG. 9B is a perspective view of the one rolling bearing.
Figure 10A:
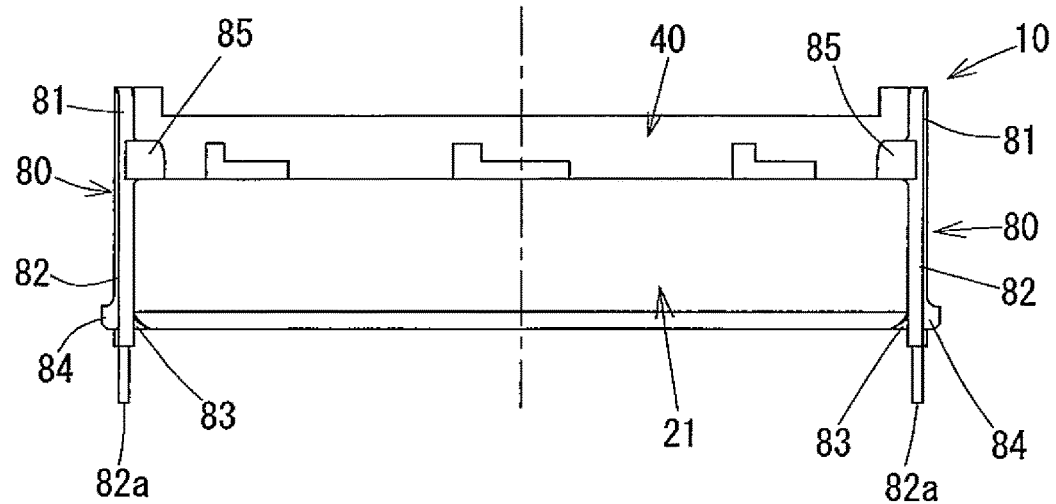
FIG. 10A is a side view of the one rolling bearing.
Figure 10B:
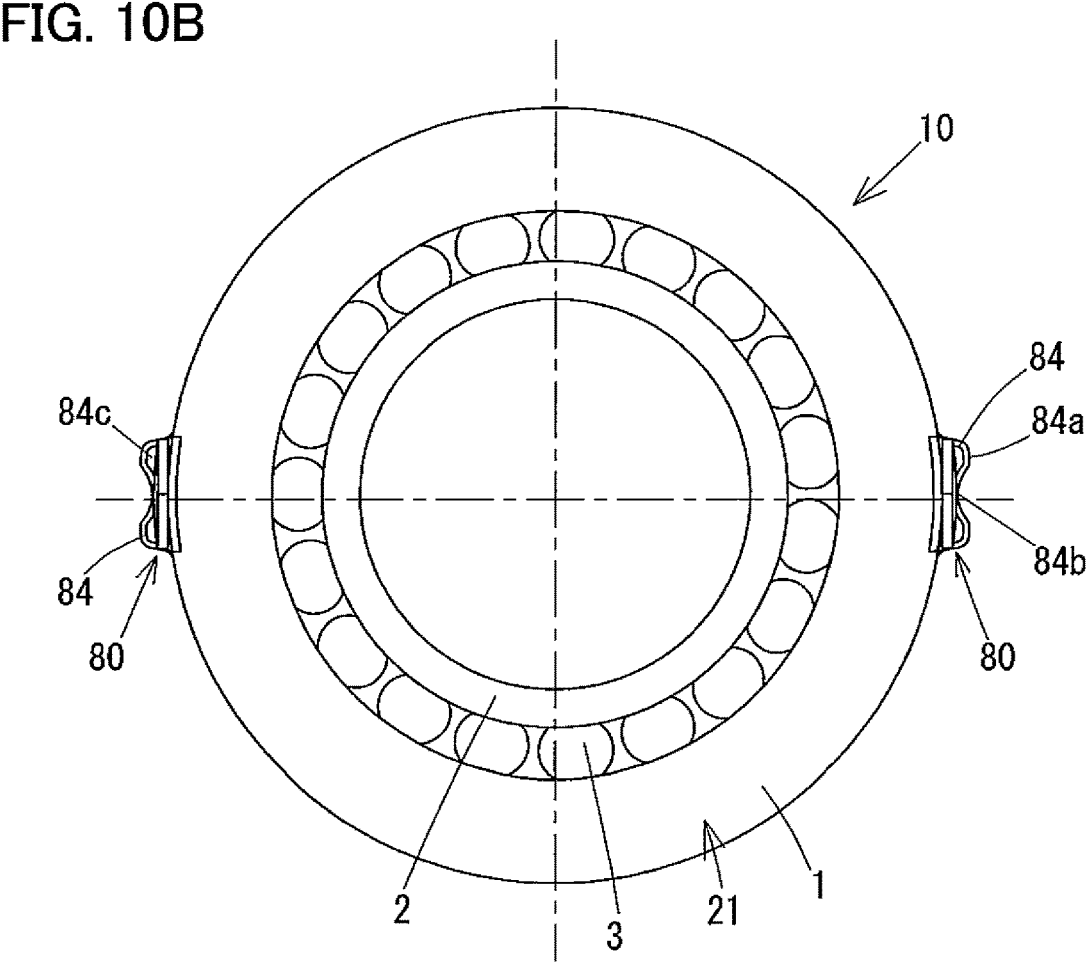
FIG. 10B is a front view of the one rolling bearing.
Figure 11:
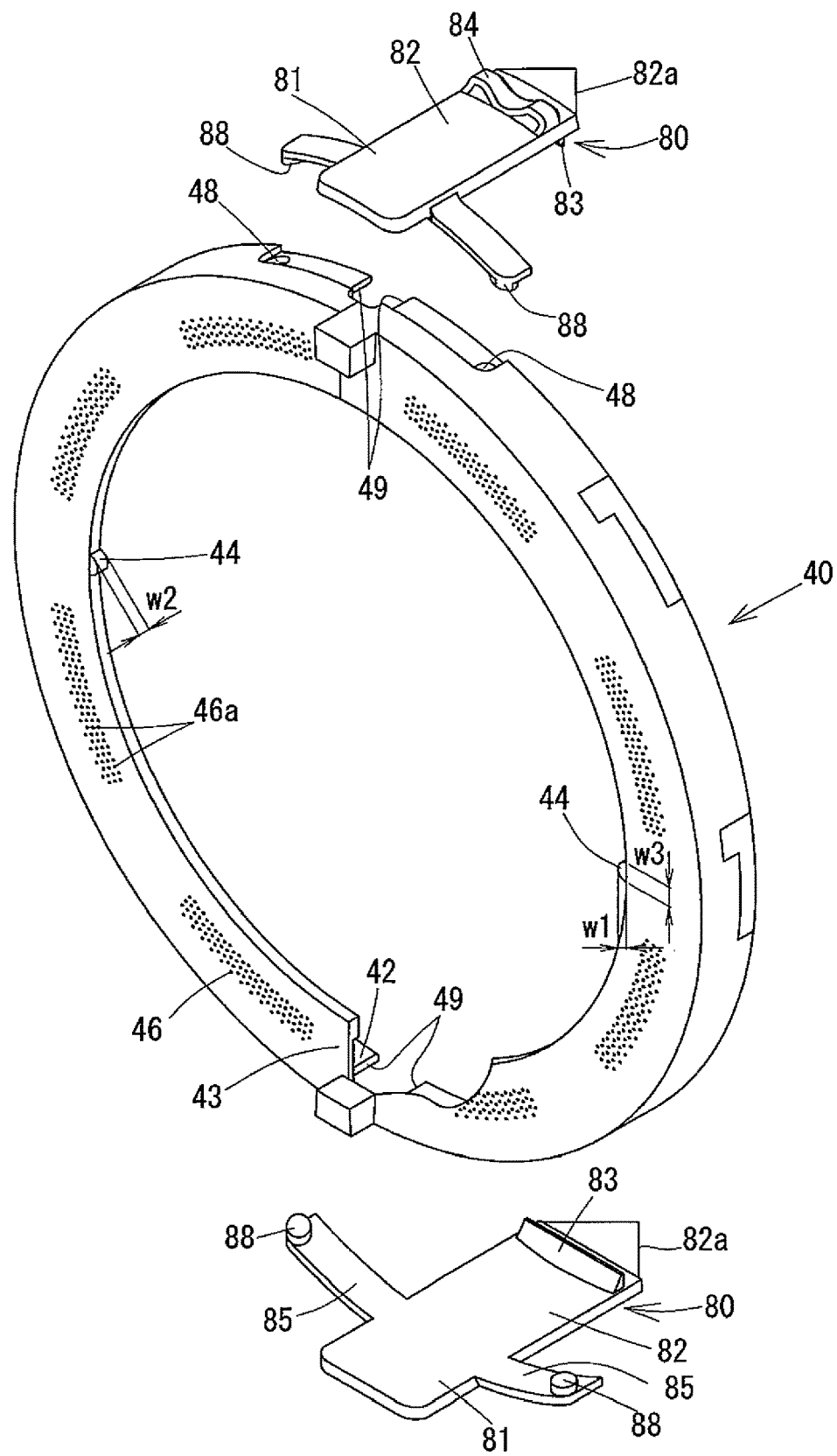
FIG. 11 is an exploded perspective view of the seal member.

As illustrated in FIGS. 8A and 11, the wall portions 43 of the seal ring 40 include, on their radially inner edges, radially inwardly extending protrusions 44 kept in sliding contact with the radially outer surface of the inner race 2. Therefore, the portions of the radially inner edges of the wall portions 43 other than the protrusions 44 are not in contact with the radially outer surface of the inner race 2.

As illustrated in FIG. 11, the protrusions 44 are symmetrically arranged with respect to the center axis of the rolling bearing 21. Especially in the embodiment, each protrusion 44 is located on the circumferential midpoint of each of the two circumferentially divided seal member parts 40', which are, as described above, coupled together as a circular annular coupled member by the coupling pieces 80. Thus, the protrusions 44 comprise two protrusions.

However, the number of the protrusions 44 may be freely increased or decreased. If each divided seal member part 40' includes two or more protrusion 44, the protrusions 44 on the radially inner edge of the divided seal member part 40' between each adjacent pair of the coupling pieces 80 may comprise protrusions each disposed on one of the straight lines that equally divide the central angle of the divided seal member part 40'. For example, if each divided seal member part 40' has a central angle of 180 degrees, the protrusions 44 on each divided seal member part 40' may comprise two protrusions each disposed on one of the two straight lines that trisect the central angel of the divided seal member part 40' so as to be spaced apart from each other at an angular interval of 60 degrees, or comprise three protrusions each disposed on one of the three straight lines that quadrisect the central angle of the divided seal member part 40' so as to be spaced apart from each other at angular intervals of 45 degrees. Preferably, the seal ring 40 includes at least two protrusions 44, and more preferably, the at least two protrusions 44 are symmetrically arranged with respect to the center axis of the rolling bearing 21.

Since only the protrusions 44 of the seal ring 40 are in sliding contact with the inner race 2, only the protrusions 44 become worn, and the other portions of the seal member 40 do not become worn. Therefore, even if any of the members constituting the seal ring 40 includes dimensional errors within the tolerance when manufactured, the final gap w between the radially inner edges of the wall portions 43 of the seal ring 40 and the radially outer surface of the inner race 2 never falls below the height w1 of each protrusion 40, thus making it possible to prevent the portions of the seal ring 40 other than the protrusions 44 from coming into sliding contact with the inner race 2 and becoming worn. If the portions of the seal ring 40 other than the protrusions 44 do not become worn, it is possible to avoid the expansion of the final gap. Also, if the protrusions 44 become worn, it is possible to easily manage the dimension of the final gap by measuring the heights w1 of the protrusions 44 which have become worn.

Since, even when the seal ring 40 thermally expands, only the protrusions 44 are in sliding contact with the radially outer surface of the inner race 2, the final gap w between the radially inner edges of the wall portions 43 of the seal ring 40 and the radially outer surface of the inner race 2 never falls below the height w1 of each protrusion 40. Therefore, even when the seal ring 40 thermally expands, it is possible to prevent the portions of the seal ring 40 other than the protrusions 44 from coming into sliding contact with the inner race 2 and becoming worn.

In the embodiment, the seal ring 40 is made of a synthetic resin, especially, a resin reinforced with glass fiber. When, in order to manufacture the seal ring 40, a mold is filled with a resin which is reinforced with glass fiber, and which has not hardened yet, glass fiber does not enter the minute recesses of the mold corresponding to the protrusions 44. Therefore, the protrusions 44 of the seal ring 40 formed by hardening the resin are made of only the resin and do not contain glass fiber. Therefore, if the protrusions 44 become worn, wear dust of glass fiber will never enter the lubricating oil.

The amount by which the protrusions 44 protrude is preferably small enough to, when a mold is filled with a resin reinforced with glass fiber, make it difficult for glass fiber to enter the recesses of the mold corresponding to the protrusions 44. Since, in the embodiment, the size of the final gap w is set at 0.3 mm, i.e., equal to the mesh size of the filters 46, the heights w1 of the protrusions 44 are also set at 0.3 mm. The axial widths w2 and the circumferential widths w3 of the protrusions 44 (see FIG. 11) can be freely set based on the required wear resistance.

In the embodiment, each protrusion 44 has a semicircular cross-section, that is, it has a circular arc surface which is the highest at its circumferential center, and decreases in height toward both circumferential sides thereof. As an alternative, however, each protrusion 44 may be, e.g., a triangular-shaped protrusion which is the highest at its circumferential center, and which linearly decreases in height toward both circumferential sides thereof.

While, in the embodiment, the seal ring 40, which includes the protrusions 44, is made of a fiber-reinforced synthetic resin, the protrusions 44, which are in abutment with the radially outer surface of the inner race 2, may be made of a different material having high wear resistance, such as a synthetic resin having high wear resistance or a metal. If a material different from the material of the body of the seal ring 40 is used for the protrusions 44, the protrusions 44 may be formed separately from the body of the seal ring 40 and integrally fitted and fixed, bonded, or welded to the body of the seal ring 40.

Figure 14A:
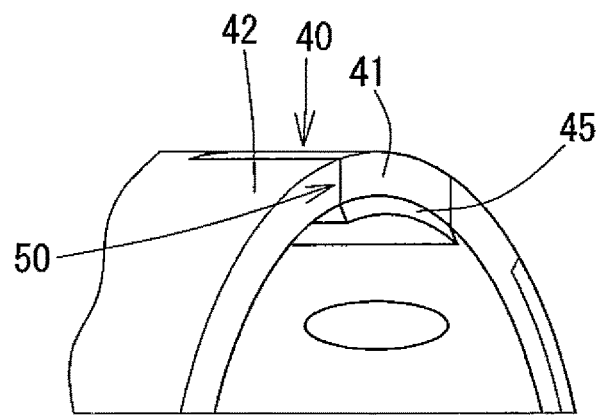
FIG. 14A is a perspective view of the abutment portion of the seal ring configured to abut against the outer race of the one rolling bearing.
Figure 14B:
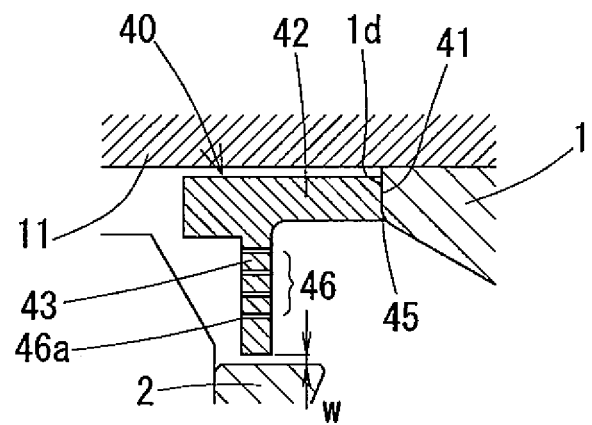
FIG. 14B is a sectional view of the abutment portion of the seal ring configured to abut against the outer race of the one rolling bearing.

As illustrated in FIGS. 14A and 14B, the seal ring 40 includes, on the cylindrical portions 42, an outer race engagement protrusion 45 configured to engage with the radially inner surface of the outer race 1, thereby restricting the radial movement of the seal ring 40. More specifically, the outer race engagement protrusion 45 engages with the ridgeline between the end surface 1d and the radially inner surface of the outer race 1, and the radially inner surface portion of the outer race 1 extending to its raceway surface 1a, thereby restricting the radial movement of the seal ring 40.

Thus, when the seal ring 40 thermally expands, the outer race engagement protrusion 45 engages with the radially inner surface of the outer race 1, thereby restricting the radially outward movement of the seal lip 40. As a result thereof, it is possible to prevent the expansion of the final gap w between the radially inner edges of the wall portions 43 and the radially outer surface of the inner race 2.

In the embodiment, the outer race engagement protrusion 45 is made of a material different from the material of the seal ring 40, and having a low linear expansion coefficient. Also, the outer race engagement protrusion 45 is disposed on a detachable member 50 formed separately from the body of the seal member 40, and integrally fitted and fixed, bonded, or welded to the body of the seal ring 40. The detachable member 50 may be made of a synthetic resin having a low linear expansion coefficient or a metal. Alternatively, the outer race engagement protrusion 45 may be integral with the seal ring 40.

Figure 14C:
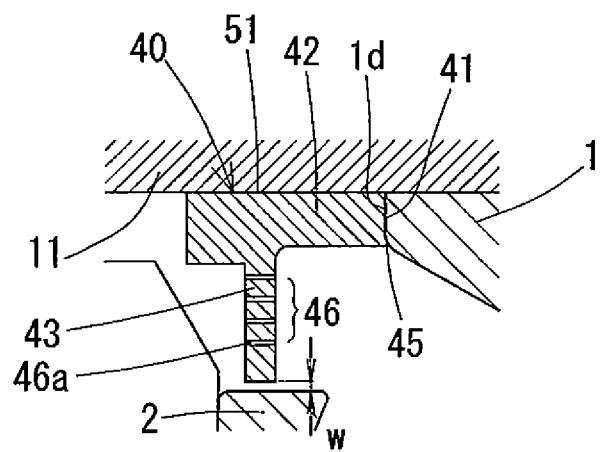
FIG. 14C is a sectional view illustrating a modification of the abutment portion of the seal ring configured to abut against the outer race of the one rolling bearing.
Figure 15A:
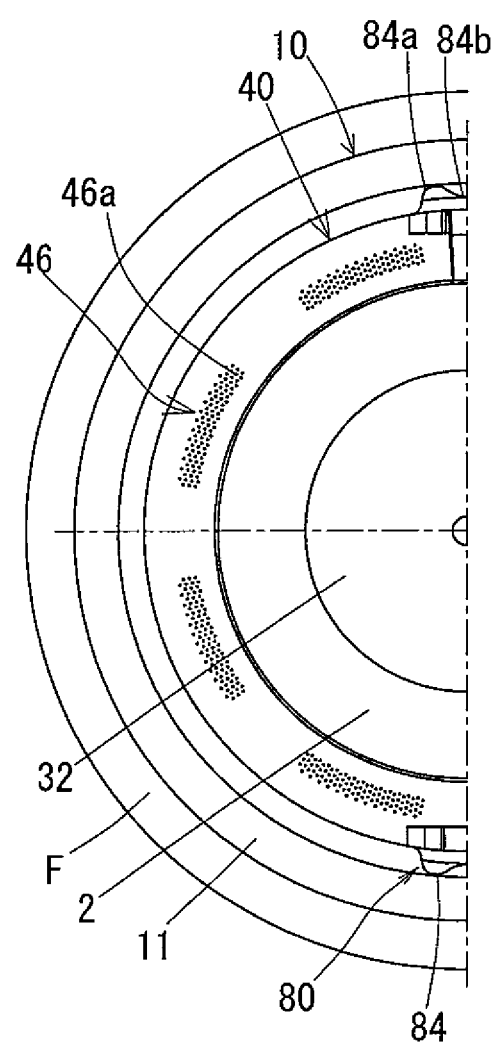
FIG. 15A is a side view of a bearing unit according to a third embodiment of the present invention, the bearing unit including a plurality of rolling bearings.
Figure 15B:
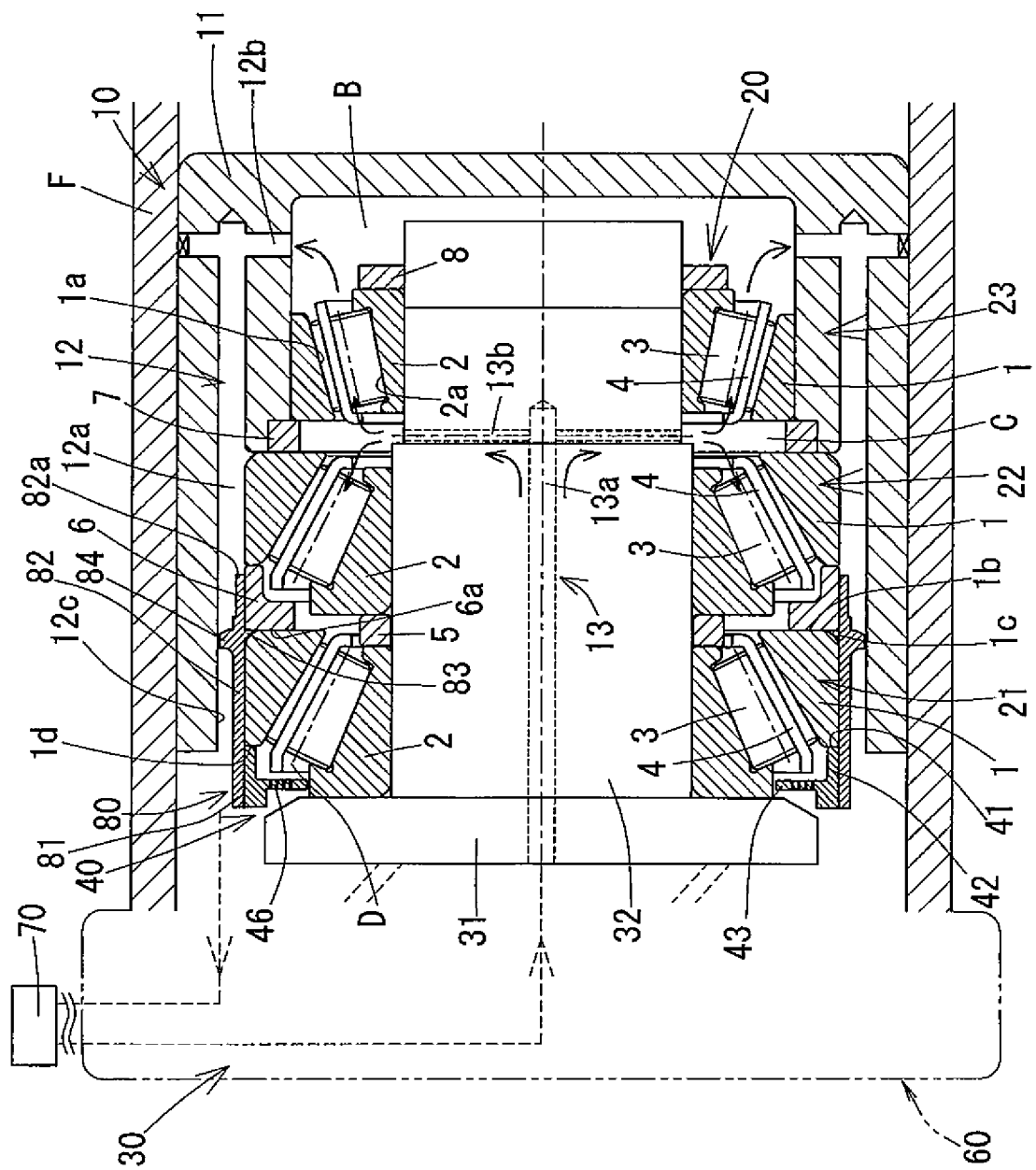
FIG. 15B is a vertical sectional view of the bearing unit according to the third embodiment of the present invention.
Figure 16A:
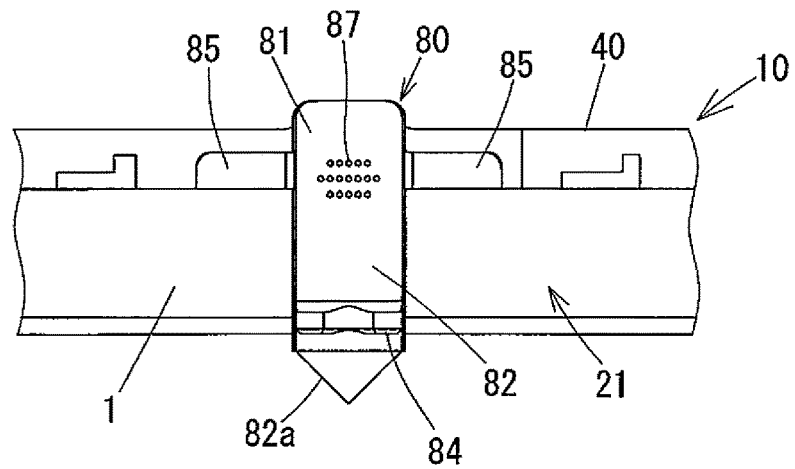
FIG. 16A is a plan view of a portion of one of the rolling bearings which includes a seal member.
Figure 16B:
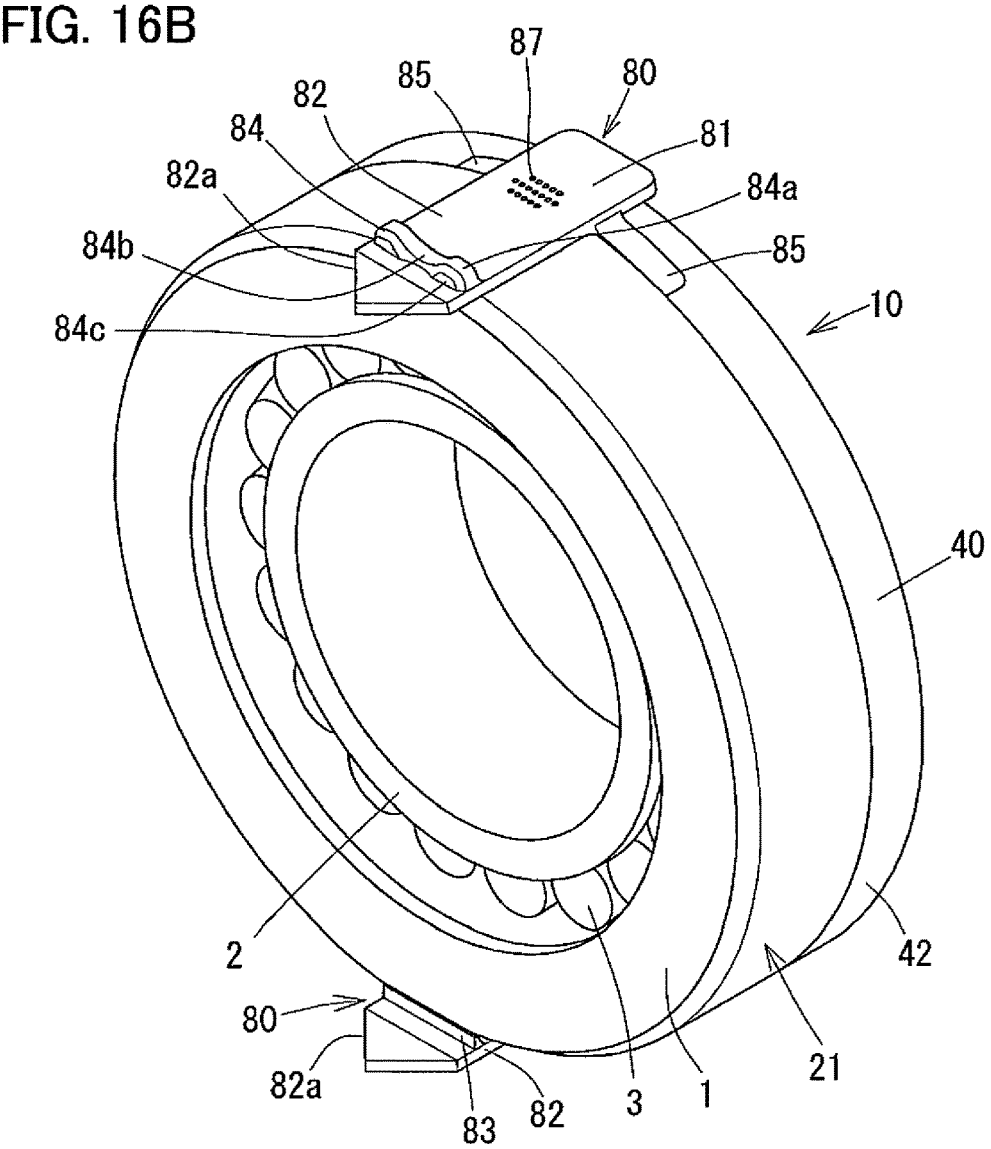
FIG. 16B is a perspective view of the one rolling bearing.
Figure 17A:
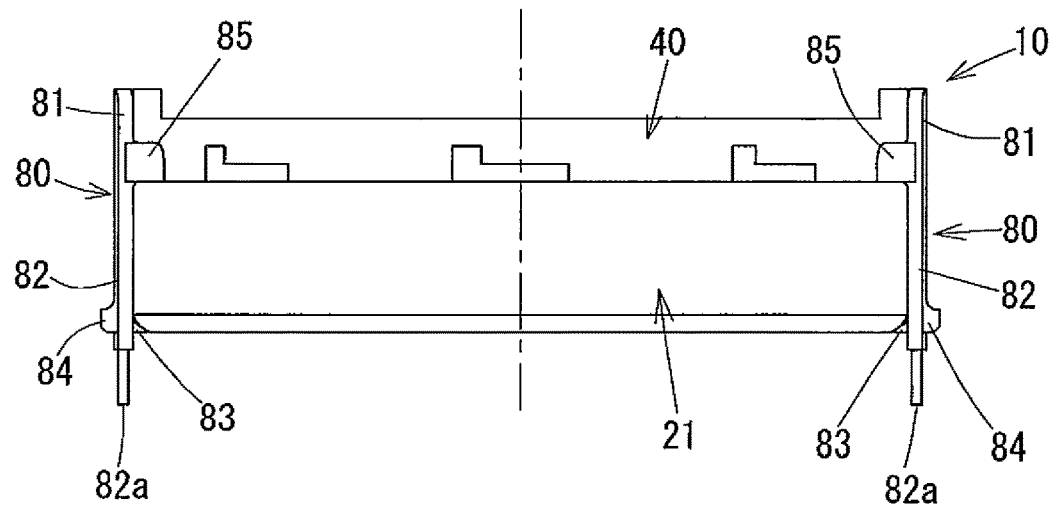
FIG. 17A is a side view of the one rolling bearing.
Figure 17B:
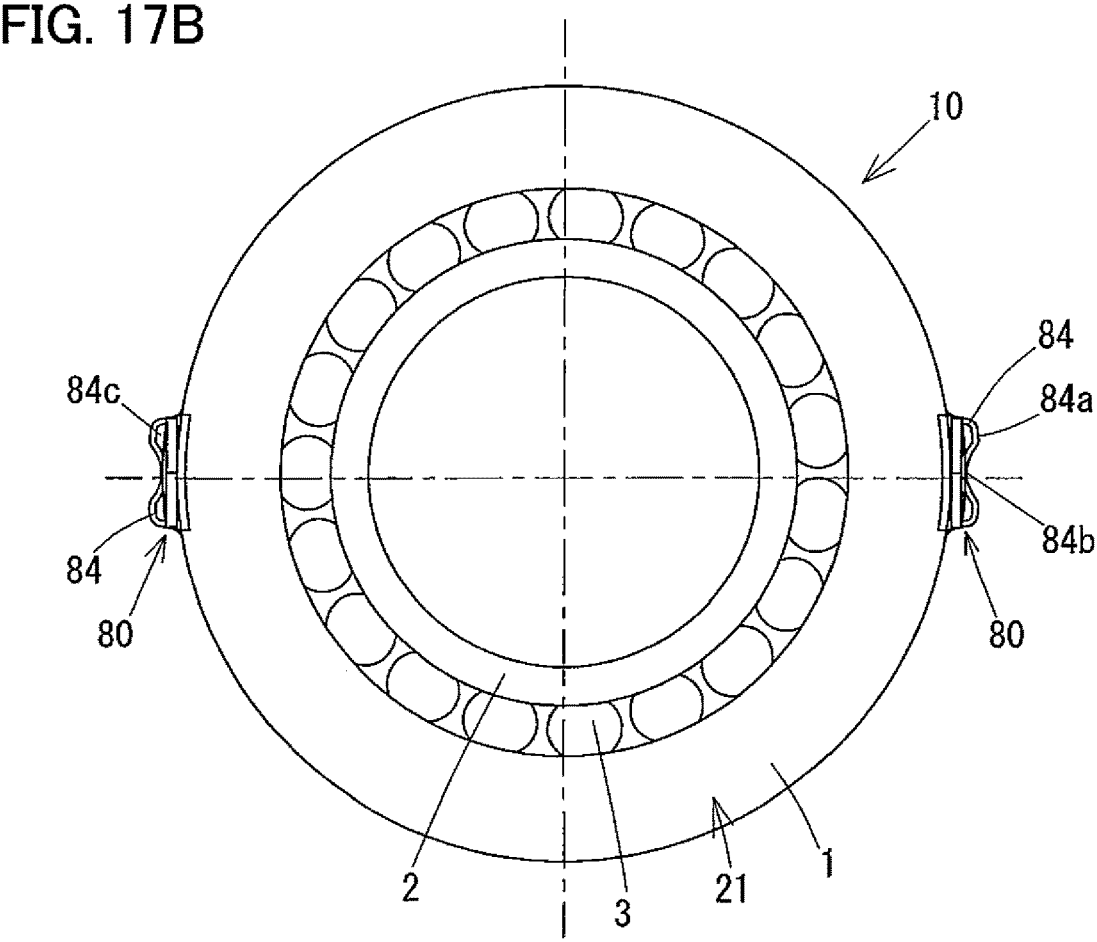
FIG. 17B is a front view of the one rolling bearing.
Figure 18:
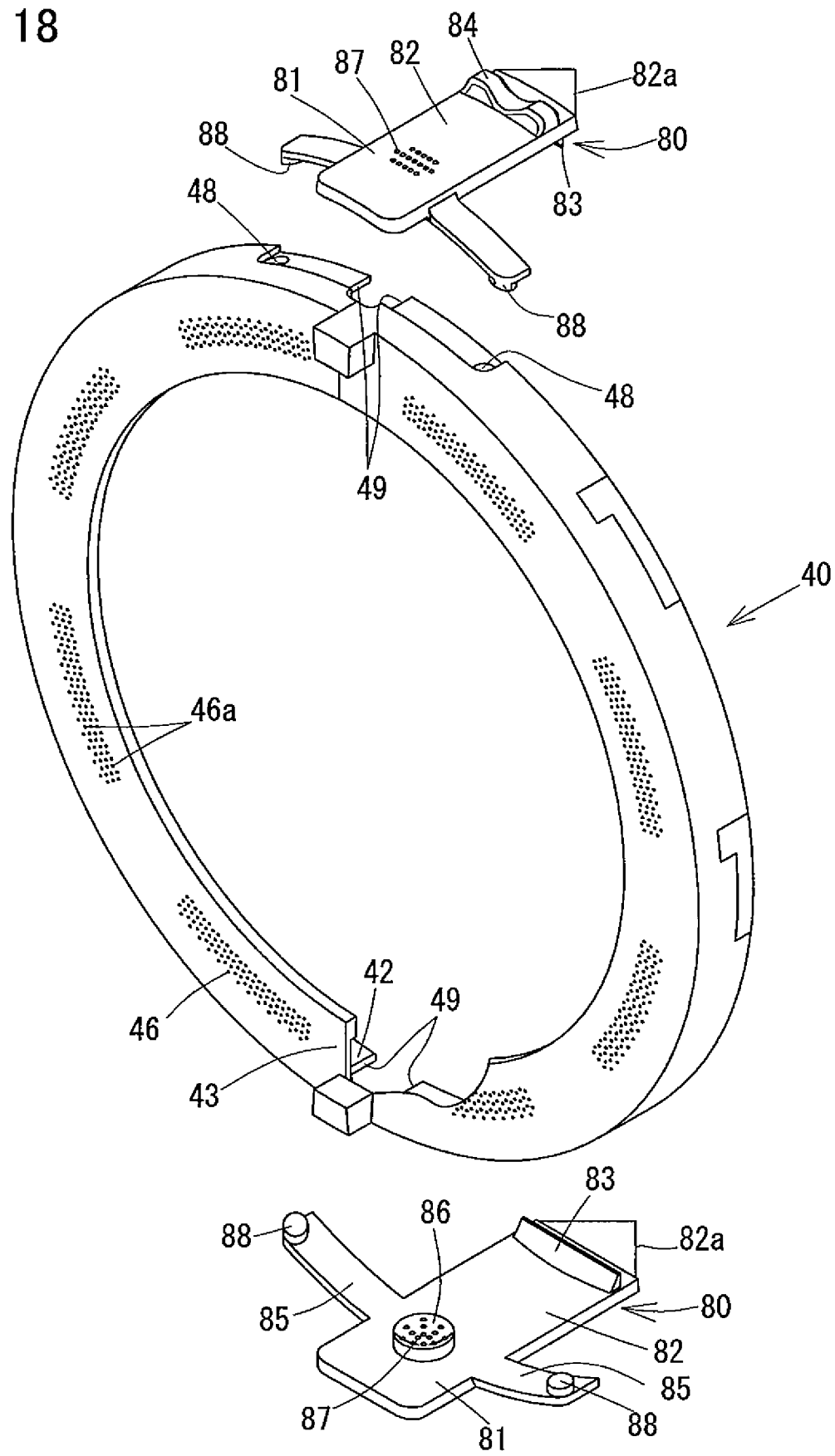
FIG. 18 is an exploded perspective view of the seal member.

In the example of FIG. 14C, the cylindrical portions 42 of the seal ring 40 include housing abutment portions 51 configured to abut against the radially inner surface of the housing 11, thereby restricting the radial movement of the seal ring 40. The reason why the seal ring 40 shown in FIG. 14C includes such housing abutment portions is because, in FIG. 8A, as described above, while the coupling pieces 80 are engaged with the inner surface of the housing 11, the cylindrical portions 42, which constitute the body of the seal ring 40, are not engaged directly with the housing 11.

In the example of FIG. 14C, when the seal ring 40 thermally expands, the housing abutment portions 51 abut against the radially inner surface of the housing 11, thereby restricting the radially outward movement of the seal ring 40. As a result thereof, it is possible to prevent the expansion of the last gap w between the radially inner edges of the wall portions 43 and the radially outer surface of the inner race 2.

In the embodiment, a sensor device may be attached to the portion of the seal ring 40 close to a filter hole 46a of one of the filters 46 so as to detect the adhesion of foreign objects such as metal dust. As such a sensor device, for example, an electric sensor device may be used which is configured to detect the existence of foreign objects between a pair of electrodes based on a change in electrical output when the foreign objects cause a short-circuit between the pair of electrodes.

For example, such an electric sensor device includes an output detector connected through a cable to the pair of electrodes and configured to detect a change in electric output when the pair of electrodes are electrically connected to each other through foreign objects comprising metal and too large to pass through the filter hole 46a of the filter 46, and thus adhering between the pair of electrodes, thereby detecting the state (amount) of metallic foreign objects contained in lubricating oil. The cable connected to the pair of electrodes extends through a substrate to the outside of the housing 11, and is connected to the output detector outside of the housing 11. A sensor hole through which the cable extends to the outside of the seal ring 40 may be disposed in one of the cylindrical portions 42 or one of the wall portions 43.

While the seal ring 40 is provided with the filters 46 in the embodiment, the present invention may be applied to a seal ring 40 including no filters 46. Also, while, in the embodiment, the seal ring 40 comprises the divided seal member parts 40' coupled together by the coupling pieces 80, the present invention may be applied to an integral, circular annular seal ring 40, i.e., a seal ring not comprising divided seal member parts.

FIGS. 15A to 21C illustrate the oil pump device according to the third embodiment of the present invention. The device of the third embodiment, illustrated in FIGS. 15A to 18, is similar in basic structure to the device of the first embodiment illustrated in FIGS. 1A to 4. Therefore, the features of the device of the third embodiment different from the features of the device of the first embodiment are mainly described below, and its common features are not described again.

In this embodiment, the seal ring 40 is attached to the end of the rolling bearing 21 such that at least one of a plurality of coupling pieces 80 is located at the lower portion of the seal ring 40. Since the circular annular seal ring 40 of the embodiment is constituted by two divided seal member parts 40' each having a central angle of 180 degrees, and coupled together by two coupling pieces 80, the two coupling pieces 80 are located at the upper and lower portions of the seal ring 40, respectively. In the specific example shown, the two coupling pieces 80 are located at the highest and lowest points of the seal ring 40, respectively.

While, in the embodiment, the circular annular seal ring 40 is constituted by two divided seal member parts 40' each having a central angle of 180 degrees, the circular annular seal ring 40 may be constituted by divided seal member parts 40' each having an central angle other than 180 degrees, for example, by four divided seal member parts 40' each having a central angle of 90 degrees, or by six divided seal member parts 40' each having a central angle of 60 degrees.

The radially inner edges of the wall portions 43 of the seal member are in sliding contact with the radially outer surface of the large-diameter flange of the inner race 2, or are opposed through a minute gap to the radially outer surface thereof, thereby forming a labyrinth seal structure between the wall portions 43 and the inner race 2 such that lubricating oil is allowed to pass through the labyrinth seal structure, but foreign objects contained in the lubricating oil is prevented from passing through the labyrinth seal structure. The size of the minute gap, i.e., the gap defined between the radially inner edges of the wall portions 43 and the radially outer surface of the large-diameter flange of the inner race 2, is set to be equal to or less than the mesh size of the filters 46.

Thus, the lubricating oil from the bearing spaces of the rolling bearings 21, 22 and 23 flows out of the bearings after passing through the filter holes 46a of the filters 46 of the seal ring 40, the holes and the gaps of the circulation paths 12, and the minute gap between the radially inner edges of the wall portions 43 and the radially outer surface of the large-diameter flange of the inner race 2. Therefore, large foreign objects that could adversely affect the operation of the operation mechanisms 30 and 70 (such as metal wear dust, and particularly flakes) are prevented from entering the operation mechanisms 30 and 70.

Figure 19A:
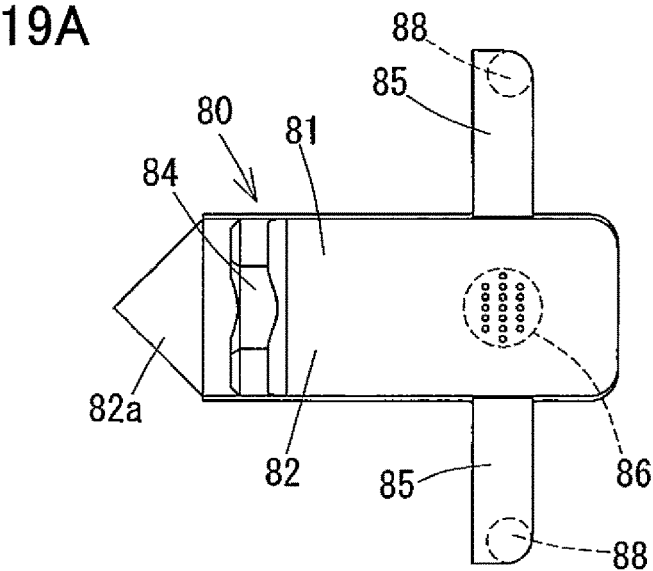
FIG. 19A is a plan view of one of coupling pieces coupling divided seal member parts together.
Figure 19B:
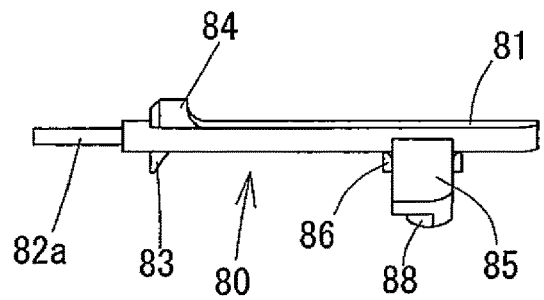
FIG. 19B is a front view of the one coupling piece.
Figure 19C:
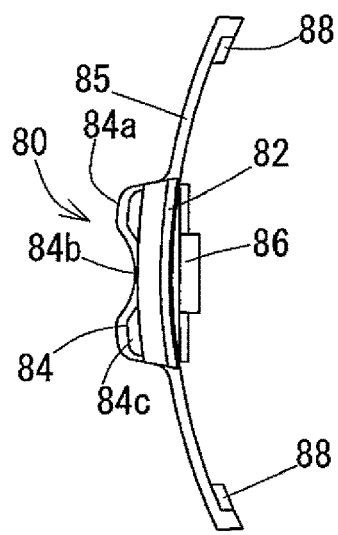
FIG. 19C is a right side view of the one coupling piece.

As illustrated in FIGS. 19A to 19C, each coupling piece 80 includes a pair of supporting portions 85 having a cylindrical surface and extending in the respective opposite circumferential directions from the base portion 81 along the radially outer surface of the seal ring 40. The pair of supporting portions 85 include a pair of radially inwardly extending engagement protrusions 88 at the respective distal ends thereof. The (circumferentially adjacent) divided seal member parts 40' include a pair of engagement holes 48 at each opposed pair of ends thereof. By engaging the pairs of engagement protrusions 88 of the respective coupling pieces 80 in the corresponding pairs of engagement holes 48, the coupling pieces 80 couple the opposed pairs of ends of the divided seal member parts 40' to each other, so that the divided seal member parts 40' are coupled together as a circular annular coupled member.

Figure 20A:
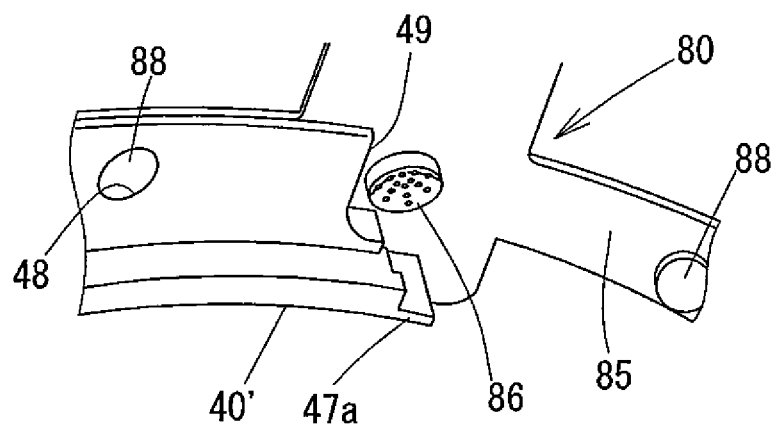
FIG. 20A is an enlarged view of connection portions of the divided seal member parts.
Figure 20B:
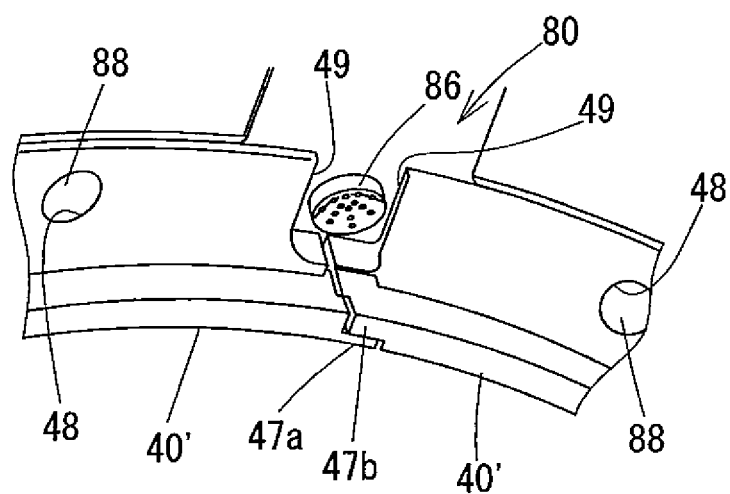
FIG. 20B is an enlarged view of the connection portions of the divided seal member parts.

As illustrated in FIGS. 20A and 20B, the wall portions 43 of the divided seal member parts 40' include, at each opposed pair of ends of the wall portions 43, a pair of opposed stepped portions 47a and 47b meshing with each other, thereby enabling the opposed pairs of ends of the divided seal member parts 40' to be more firmly coupled together.

Each coupling piece 80 includes, on the inner surface thereof, a concave, foreign object catching portion 86 having a concave surface facing a cutout 49 defined by the opposed pair of edges of the (circumferentially adjacent) divided seal member parts 40', and thus exposed to the bearing interior space of the rolling bearing 21, which is located radially inwardly of the seal ring 40. The concave, foreign object catching portion 86 of the coupling piece 80 at the lower portion of the seal ring 40 faces upward toward the bearing interior space, The foreign object catching portion 86 of each coupling piece 80 includes foreign object discharge ports 87 vertically extending through the coupling piece 80 from its radially inner to radially outer side so that the bearing interior space communicates with the bearing exterior through the foreign object discharge ports 87. The foreign object discharge ports 87 are sized such that foreign objects smaller than a foreign object catching portion detection threshold value set at sensor devices 90 can be discharged to the bearing exterior through the foreign object discharge ports 87. Namely, the diameters of the foreign object discharge ports 87 are set to be smaller than the minimum diameter of foreign objects to be detected by the sensor devices 90.

The foreign object catching portion 86 of each coupling piece 80 includes an upwardly facing concave pocket. In the specific example shown, the concave pocket of each concave, foreign object catching portion 86 is funnel-shaped, and the foreign object discharge ports 87 are distributed over the entire area of the funnel-shaped concave pocket.

In the embodiment, the outer race of the rolling bearing 21 is stationary, and the inner race 2 of the rolling bearing 21 is rotatable. When the inner race 2 rotates, lubricating oil flows in the circumferential direction of the seal ring 40 after flowing out through the side opening D (located close to the one axial end of the device 10) of the bearing space of the rolling bearing 21, the openings 12C (located close to the one axial end of the device 10) of the circulation paths 12, and the gap between the radially inner edges of the wall portions 43 and the radially outer surface of the large-diameter flange of the inner race 2. Among all the foreign objects contained in the lubrication oil, such as metal dust or metal pieces generated in the rolling bearings 21, 22 and 23, foreign objects having large particle diameters cannot pass through any of the filters 46, the gaps of the openings 12c of the circulation paths 12, and the gap between the radially inner edges of the wall portions 43 and the radially outer surface of the large-diameter flange of the inner race 2, and thus are caught by, and remain at, the filters 46, the gaps of the openings 12c, and the gap between the wall portions 43 and the inner race 2.

Among all the foreign objects contained in the lubricating oil, foreign objects which have small particle diameters and thus are caught by none of the filters 46, the gaps of the openings 12c, and the gap between the wall portions 43 and the inner race 2 flow out to the bearing exterior without being caught midway. The entry of a small number of foreign objects having small particle diameters into the operation mechanisms 30 and 70 will never cause or lead to the malfunction of the operation mechanisms 30 and 70. However, if foreign objects having small particle diameters and contained in the lubricating oil increase in number, and nothing is done to prevent this increase, the operation mechanisms 30 and 70 might malfunction in the future. In order to avoid this, the sensor device 90 detects the amount of foreign objects having small particle diameters that have settled, by their own weight, into the foreign object catching portions 86 after the rotation of the inner race 2 of the rolling bearing 21 stops.

Figure 21A:
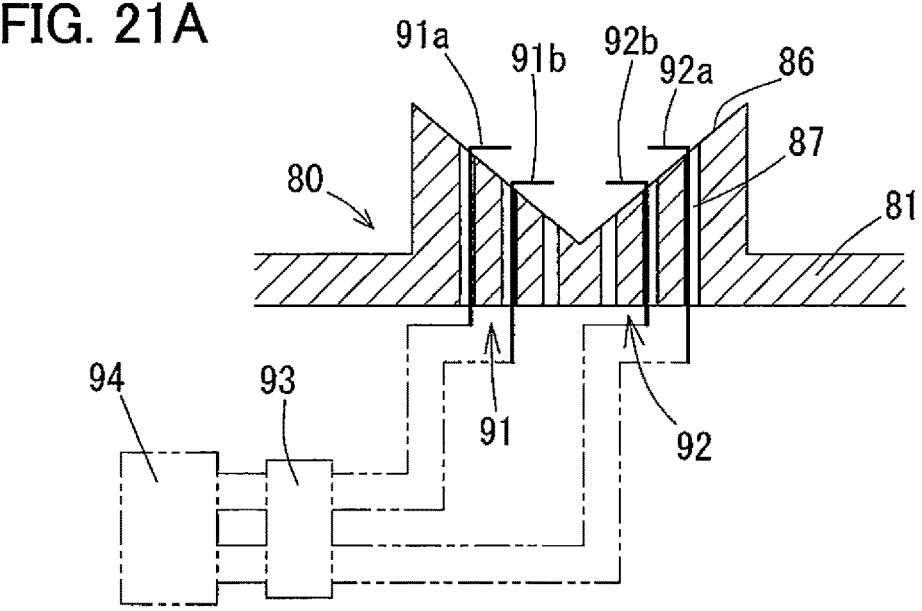
FIG. 21A is a sectional view of a foreign object catching portion.
Figure 21B:
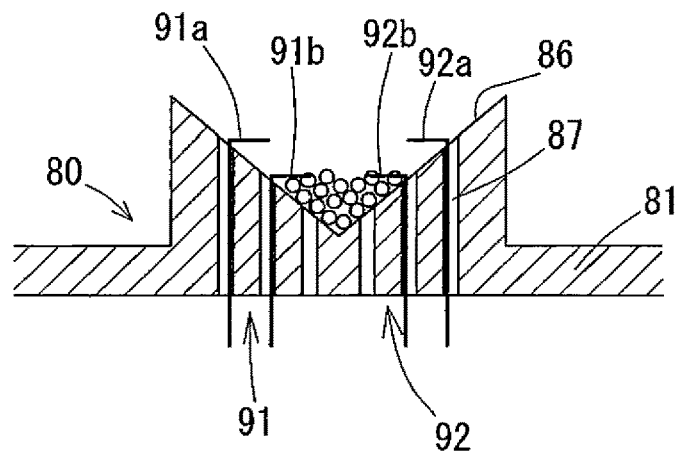
FIG. 21B is a sectional view of the foreign object catching portion.
Figure 21C:
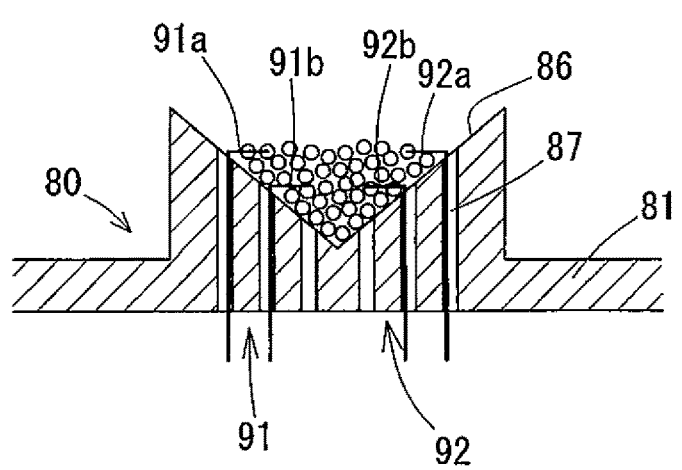
FIG. 21C is a sectional view of the foreign object catching portion.

FIGS. 21A to 21C illustrate the detailed structure of the sensor device 90 mounted to one of the foreign object catching portions 86. The sensor device 90 includes pairs of electrodes 91 and 92, and is configured to electrically detect metallic foreign objects adhering between each pair of electrodes 91 and 92.

In particular, the sensor device 90 further includes an output detector 94 connected to the pairs of electrodes 91 and 92 through a cable, and configured to detect the state (amount) of the metallic foreign objects contained in lubricating oil based on a change in electric output when each pair of the electrodes 91 and 92 are electrically connected to each other through the foreign objects adhering between the electrodes 91 and 92. The cable connected to the pairs of electrodes 91 and 92 extends to the outside of the housing 11 through a sensor hole in the coupling piece 80, and through a substrate 93. The output detector 94, which is connected to the cable, is mounted to a predetermined portion of the bearing unit 20, or outside the bearing unit 20. The substrate 93 may be disposed near the sensor device 90, e.g., attached to the coupling piece 80. One of the foreign object discharge ports 87 may be used as the sensor hole.

The pairs of electrodes 91 and 92 vertically extend in the recess of the foreign object catching portion 86 such that the distances between the respective pairs of electrodes 91 and 92 are different from each other.

In the embodiment, the funnel-shaped inner surface of the foreign object catching portion 86 narrows radially outwardly. Also, the pairs of electrodes 91 and 92 are arranged along the funnel-shaped inner surface of the foreign object catching portion 86 such that the closer each pair of electrodes 91 and 92 are located to the radially outer apex of the funnel-shaped inner surface, the shorter the distance therebetween. Therefore, it is possible to deal with foreign objects having various dimensions, and detect not only the existence, but also the amount, of accumulated foreign objects. The diameters of the foreign object discharge ports 87 are set to be equal to the minimum diameter of the foreign objects to be detected by the sensor device 90, i.e., to the foreign object catching portion detection threshold value.

Namely, as illustrated in FIGS. 21A to 21C, foreign objects too large t to pass through the foreign object discharge ports 87 accumulate on any portion of the funnel-shaped inner surface of the foreign object catching portions 86 according to their dimensions, thereby reliably causing al short-circuit between at least one pair of electrodes 91 and 92. Namely, the sensor device 90 can effectively catch and detect foreign objects having dimensions larger than the object catching portion detection threshold value, and also grasp the particle diameters of the detected foreign objects based on the change in electric output.

The sensor device 90 can also grasp the amount of foreign objects contained in lubricating oil. For example, in FIGS. 21A to 21C, the pairs of electrodes 91 and 92 comprise two pairs of electrodes 91a and 92a; and 91b and 92b arranged such that the distance between the pair of electrodes 91a and 92a is larger than the distance between the pair of electrodes 91b and 92b. With this arrangement, if short-circuits occur both between the pair of electrodes 91a and 92a and between the pair of 91b and 92b by foreign objects adhering therebetween, the sensor device 90 can judge this state as rank 1, which indicates that the amount of accumulated foreign objects is large, and thus the amount of foreign objects contained in lubricating oil is large. Also, if a short-circuit does not occur between the pair of electrodes 91a and 92a, and occurs only between the pair of electrodes 91b and 92b by foreign objects adhering therebetween, the sensor device 90 can judge this state as rank 2, which indicates that the amount of foreign objects contained in lubricating oil is small.

While, in the embodiment, the foreign object catching portions 86 have a radially outwardly narrowing funnel-shaped inner surface, the inner surfaces of the foreign object catching portions 86 may have a shape other than a radially outwardly narrowing funnel shape, such as a cylindrical shape. However, even in this case, the foreign object catching portion 86 of the coupling piece 80 at the lower portion of the seal ring 40 preferably has an upwardly facing recessed inner surface.

While, in the embodiment, the foreign object catching portions 86 are disposed on the inner surfaces of the respective coupling pieces 80, the foreign object catching portion 86 at the bottom of the seal ring 40 may be instead disposed on the inner surface of one of the cylindrical portions 42. Especially if none/neither of the coupling pieces 80 is located at the lower portion of the seal ring 40, the foreign object catching portions 86 and/or the sensor devices 90 may be instead disposed on the inner surfaces of the cylindrical portions 42. If an integral, circular annular seal ring 40 is used, too, the foreign object catching portions 86 and/or the sensor devices 90 may be disposed on the cylindrical portion 42 of the integral, circular annular seal ring 40.

While the sensor devices 90 comprise electric sensor devices in the embodiment, the sensor devices 90 may comprise, e.g., optical sensor devices configured to detect foreign objects by light.

In each of the above embodiments, a sensor device configured to detect the adhesion of foreign objects/matter (e.g., metal dust) may be disposed in the vicinity of a filter hole 46a of any filter 46 of the seal rings 40. Such a sensor device may comprise, e.g., an electric sensor device configured to detect foreign objects based on a change in electric output when a short-circuit occurs between a pair (or pairs) of electrodes by the foreign objects adhering therebetween.

For example, such an electric sensor device includes an output detector connected through a cable to the pair of electrodes and configured to detect a change in electric output when the pair of electrodes are electrically connected to each other through foreign objects comprising metal and too large to pass through the filter holes 46a of the filter 46, and thus adhering between the pair of electrodes, thereby detecting the state (amount) of metallic foreign objects contained in lubricating oil. The cable connected to the pair of electrodes extends through a substrate to the outside of the housing 11, and is connected to the output detector outside the housing 11. A sensor hole through which the cable extends to the outside of the seal ring 40 may be disposed in one of the cylindrical portions 42 or one of the wall portions 43.

The distance adjusting means according to the first embodiment may be used in the second embodiment and the third embodiment. The protrusions disposed on the radially inner edge of the seal member of the second embodiment, and kept in sliding contact with the radially outer surface of the inner race of one of the rolling bearings may be used in the third embodiment.

The seal member embodying the present invention may be used in various kinds of rolling bearing units other than the rolling bearing unit embodying the present invention. Also, the rolling bearing unit including the seal member embodying the present invention may be used in various kinds of devices other than the oil pump 60. Especially, the rolling bearing unit of the present invention may be used in various kinds of devices which need to prevent foreign objects, such as wear dust (e.g., iron dust) generated in the rolling bearings, from entering the operation mechanism 70, located midway of the circulation path through which lubrication oil circulates.

DESCRIPTION OF REFERENCE NUMERALS

1: outer race
2: inner race
3: rolling element
4: retainer
5, 6, 7: spacer
8: presser
10: oil pump device
11: housing
12, 13: circulation path
20: bearing unit
21, 22, 23: rolling bearing
30: operation mechanism
31: connection member
32: shaft member
40: seal ring (seal member)
40': divided seal member part
44: protrusion
45: outer race engagement protrusion
46: filter
47a, 47b: key-shaped portion
48, 48a, 48b: engagement hole
49: cutout
50: detachable member
51: housing abutment portion
60: oil pump
70: operation mechanism
80: coupling piece
81: base portion
82: axial member
83: radially inner side protrusion
84: radially outer side protrusion
85: supporting portion
86: foreign object catching portion
87: foreign object discharge port
88, 88a, 88b: engagement protrusion
89: anti-separation projection
90: sensor device
91, 92: electrode

The invention claimed is:

1. A rolling bearing unit comprising:
an outer race and an inner race between which a bearing space is defined;
rolling elements disposed in the bearing space; and
a circular annular seal member attached to the outer race or a member fixed to the outer race, and covering a side opening of the bearing space,
wherein the circular annular seal member includes:
two or more than two seal member parts divided in a circumferential direction, and coupled together as a circular annular coupled member by coupling pieces; and
a distance adjuster capable of adjusting a circumferential distance between a pair of connection portions where the two seal member parts or one circumferentially adjacent pair of the more than two seal member parts are connected to a corresponding one of the coupling pieces, and
wherein:
each of the two or more than two seal member parts includes a cylindrical portion abutting against an end surface of the outer race;
a wall portion extending radially inwardly from an axial end of the cylindrical portion; and
either the cylindrical portions or the wall portions of the two seal member parts or the one circumferentially adjacent pair of the more than two seal members include, at respective opposed portions thereof, a pair of stepped portions meshing with each other.

2. The rolling bearing unit according to claim 1, wherein the distance adjuster includes:
a pair of engaged portions disposed on a corresponding one of the coupling pieces;
a plurality of first engaging portions disposed on one of circumferentially opposed ends of the two seal member parts or a corresponding circumferentially adjacent pair of the more than two seal member parts, the first engaging portions being arranged in the circumferential direction; and
a plurality of second engaging portions disposed on the other of the circumferentially opposed ends so as to be arranged in the circumferential direction,
wherein the engaged portions and the engaging portions are arranged such that one of the pair of engaged portions is capable of engaging any one of the plurality of first engaging portions, and the other of the pair of engaged portions is capable of engaging any one of the plurality of second engaging portions.

3. The rolling bearing unit according to claim 2, wherein the engaging portions comprise protrusions, and the engaged portions comprise recesses in which the protrusions can engage.

4. The rolling bearing unit according to claim 3, wherein either the protrusions or the recesses include, respectively, anti-separation projections configured to prevent the protrusions from separating from the respective recesses.

5. The rolling bearing unit according to claim 2, wherein the engaged portions comprise protrusions, and the engaging portions comprise recesses in which the protrusions can engage.

6. The rolling bearing unit according to claim 5, wherein either the protrusions or the recesses include, respectively, anti-separation projections configured to prevent the protrusions from separating from the respective recesses.

7. The rolling bearing unit according to claim 1, wherein the distance adjuster includes:
a pair of engaged portions disposed, respectively, on circumferentially opposed ends of the two seal member parts or a corresponding circumferentially adjacent pair of the more than two seal member parts;
a plurality of first engaging portions disposed on a corresponding one of the coupling pieces so as to be arranged in the circumferential direction; and
a plurality of second engaging portions disposed on the corresponding one of the coupling pieces so as to be arranged in the circumferential direction.

8. The rolling bearing unit according to claim 1, wherein a gap is defined between circumferentially opposed ends of the cylindrical portions of the two seal member parts or the one circumferentially adjacent pair of the more than two seal member parts, the gap being closed by a corresponding one of the coupling pieces.

9. A rolling bearing unit comprising:
an outer race and an inner race between which a bearing space is defined;
rolling elements disposed in the bearing space;
a circular annular seal member attached to the outer race or a member fixed to the outer race, and covering a side opening of the bearing space, and
a protrusion disposed on a radially inner edge of the circular annular seal member, and kept in sliding contact with a radially outer surface of the inner race, wherein:
the circular annular seal member comprises a plurality of circumferentially divided seal member parts coupled together as a circular annular coupled member by coupling pieces; and
the protrusion is one of a plurality of protrusions, and one or more of the plurality of protrusions are disposed on a straight line or lines equally dividing a central angle of each of the circumferentially divided seal member parts.

10. The rolling bearing unit according to claim 9, wherein the protrusions are symmetrically arranged with respect to a center axis of the rolling bearing unit.

11. The rolling bearing unit according to claim 9, wherein the circular annular seal member is made of a resin reinforced with fiber.

12. The rolling bearing unit according to claim 9, wherein the circular annular seal member comprises a seal ring including a cylindrical portion abutting against an end surface of the outer race, and a wall portion extending radially inwardly from an axial end of the cylindrical portion, and
wherein the cylindrical portion includes an outer race engagement protrusion configured to engage with a radially inner surface of the outer race so as to restrict a radial movement of the seal ring.

13. The rolling bearing unit according to claim 9, wherein the outer race is fixed to a housing,
wherein the circular annular seal member comprises a seal ring including a cylindrical portion abutting against an end surface of the outer race, and a wall portion extending radially inwardly from an axial end of the cylindrical portion, and
wherein the cylindrical portion includes a housing abutment portion configured to abut against a radially inner surface of the housing so as to restrict a radial movement of the seal ring.

14. A rolling bearing unit comprising:
an outer race and an inner race between which a bearing space is defined, and one of which is a stationary bearing race;
rolling elements disposed in the bearing space;
a circular annular seal member attached to one of the stationary bearing race, and a member fixed to the stationary bearing race, the circular annular seal member covering a side opening of the bearing space;
a foreign object catching portion mounted to a lower portion of the circular annular seal member; and
a sensor device mounted to the foreign object catching portion, and configured to detect foreign objects contained in lubricating oil,
wherein:
the circular annular seal member comprises a plurality of circumferentially divided seal member parts coupled together as a circular annular coupled member by coupling pieces; and
one of the coupling pieces is provided with the foreign object catching portion.

15. The rolling bearing unit according to claim 14, wherein the sensor device is configured to electrically detect foreign objects comprising metal, and adhering between a pair of electrodes.

16. The rolling bearing unit according to claim 15, wherein the foreign object catching portion includes a foreign object discharge port vertically extending through the seal member from a side of the seal member facing the bearing space to a side of the seal member opposite from the bearing space.

17. The rolling bearing unit according to claim 16, wherein the foreign object catching portion includes an upwardly facing concave pocket.

18. The rolling bearing unit according to claim 15, wherein the concave pocket comprises a funnel-shaped pocket,
wherein the foreign object discharge port is located in the funnel-shaped pocket, and
wherein the pair of electrodes comprise a plurality of pairs of electrodes disposed along a vertical direction in the funnel-shaped pocket such that distances between the respective pairs of electrodes are different from each other.

* * * * *